US012582929B2

(12) United States Patent (10) Patent No.: US 12,582,929 B2
Gregerson et al. (45) Date of Patent: Mar. 24, 2026

(54) KIT FOR AIR-FILTRATION ASSEMBLY

(71) Applicant: 3M INNOVATIVE PROPERTIES COMPANY, St. Paul, MN (US)

(72) Inventors: Glen O. Gregerson, Hudson, WI (US); Riley J. Hillstrom, North Hudson, WI (US); Laszlo Titkos, Shoreview, MN (US); Bo Yang, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 413 days.

(21) Appl. No.: 18/386,008

(22) Filed: Nov. 1, 2023

(65) Prior Publication Data

US 2024/0149198 A1 May 9, 2024

Related U.S. Application Data

(60) Provisional application No. 63/423,281, filed on Nov. 7, 2022.

(51) Int. Cl.
 B01D 46/00 (2022.01)
 B01D 46/12 (2022.01)

(52) U.S. Cl.
 CPC ..... B01D 46/0001 (2013.01); B01D 46/0005 (2013.01); B01D 46/0016 (2013.01); B01D 46/0047 (2013.01); B01D 46/12 (2013.01); B01D 2267/30 (2013.01); B01D 2279/40 (2013.01)

(58) Field of Classification Search
 CPC ............ B01D 46/0001; B01D 46/0005; B01D 46/0016; B01D 46/0047; B01D 46/12; B01D 2267/30; B01D 2279/40; B01D 46/58; B01D 2275/205
See application file for complete search history.

(56) References Cited

U.S. PATENT DOCUMENTS

| | | | | |
|---|---|---|---|---|
| 4,570,844 A | * | 2/1986 | Wysocki | .............. B65D 5/2009 |
| | | | | 55/DIG. 31 |
| 5,252,111 A | * | 10/1993 | Spencer | ............. B01D 46/2486 |
| | | | | 55/496 |
| 5,273,564 A | * | 12/1993 | Hill | .................... B01D 46/0016 |
| | | | | 55/497 |
| 6,740,137 B2 | | 5/2004 | Kubokawa et al. | |
| 7,622,063 B2 | | 11/2009 | Sundet et al. | |

(Continued)

FOREIGN PATENT DOCUMENTS

| | | |
|---|---|---|
| WO | 2021191797 A1 | 9/2021 |
| WO | 2023119077 A2 | 6/2023 |

*Primary Examiner* — Jennifer Dieterle
*Assistant Examiner* — Phillip Y Shao
(74) *Attorney, Agent, or Firm* — Kenneth B. Wood

(57) ABSTRACT

A kit that includes a base with a floor and four edges; a cover with a ceiling and four edges; and, four side panels, at least one of which is a framed air filter. The kit may be nestable. The kit is assemblable into an upwardly-open, horizontally-closed air-filtration assembly. The floor of the base may include multiple through-cuts and hinged connections that define multiple areas of the floor that are rotatable upward to provide multiple upwardly-protruding tabs; the ceiling of the cover may include multiple through-cuts and hinged connections that define multiple areas of the ceiling that are rotatable downward to provide multiple downwardly-protruding tabs.

20 Claims, 9 Drawing Sheets

(56) References Cited

U.S. PATENT DOCUMENTS

| | | |
|---|---|---|
| 7,947,142 B2 | 5/2011 | Fox et al. |
| 8,162,153 B2 | 4/2012 | Fox et al. |
| 8,240,484 B2 | 8/2012 | Fox et al. |
| 9,174,159 B2 | 11/2015 | Sanocki et al. |
| 9,320,998 B2 * | 4/2016 | Gillilan .............. B01D 46/0016 |
| 10,406,472 B2 | 9/2019 | Zhang et al. |
| 10,994,235 B2 | 5/2021 | Zhang et al. |
| 11,192,059 B2 | 12/2021 | Fox et al. |
| 11,253,807 B2 | 2/2022 | Gregerson et al. |
| 2004/0182055 A1 * | 9/2004 | Wynn ................... B01D 46/10 |
| | | 55/497 |
| 2020/0139285 A1 | 5/2020 | Menken et al. |
| 2021/0229022 A1 | 7/2021 | Zhang et al. |
| 2021/0229023 A1 | 7/2021 | Lise et al. |

* cited by examiner

KIT FOR AIR-FILTRATION ASSEMBLY

BACKGROUND

Air filters are commonly used in forced air systems such as residential and commercial heating and air-conditioning (HVAC) systems, and in room air purifiers and similar products.

SUMMARY

Herein are disclosed kits that are assemblable into air-filtration assemblies, methods of assembling such kits, and methods of using a resulting air-filtration assembly. Such a kit may include a base with a floor and four edges; a cover with a ceiling and four edges; and, four side panels, at least one of which is a framed air filter. Such a kit may be nestable. Such a kit is assemblable into an upwardly-open, horizontally-closed air-filtration assembly. These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Figure 2:
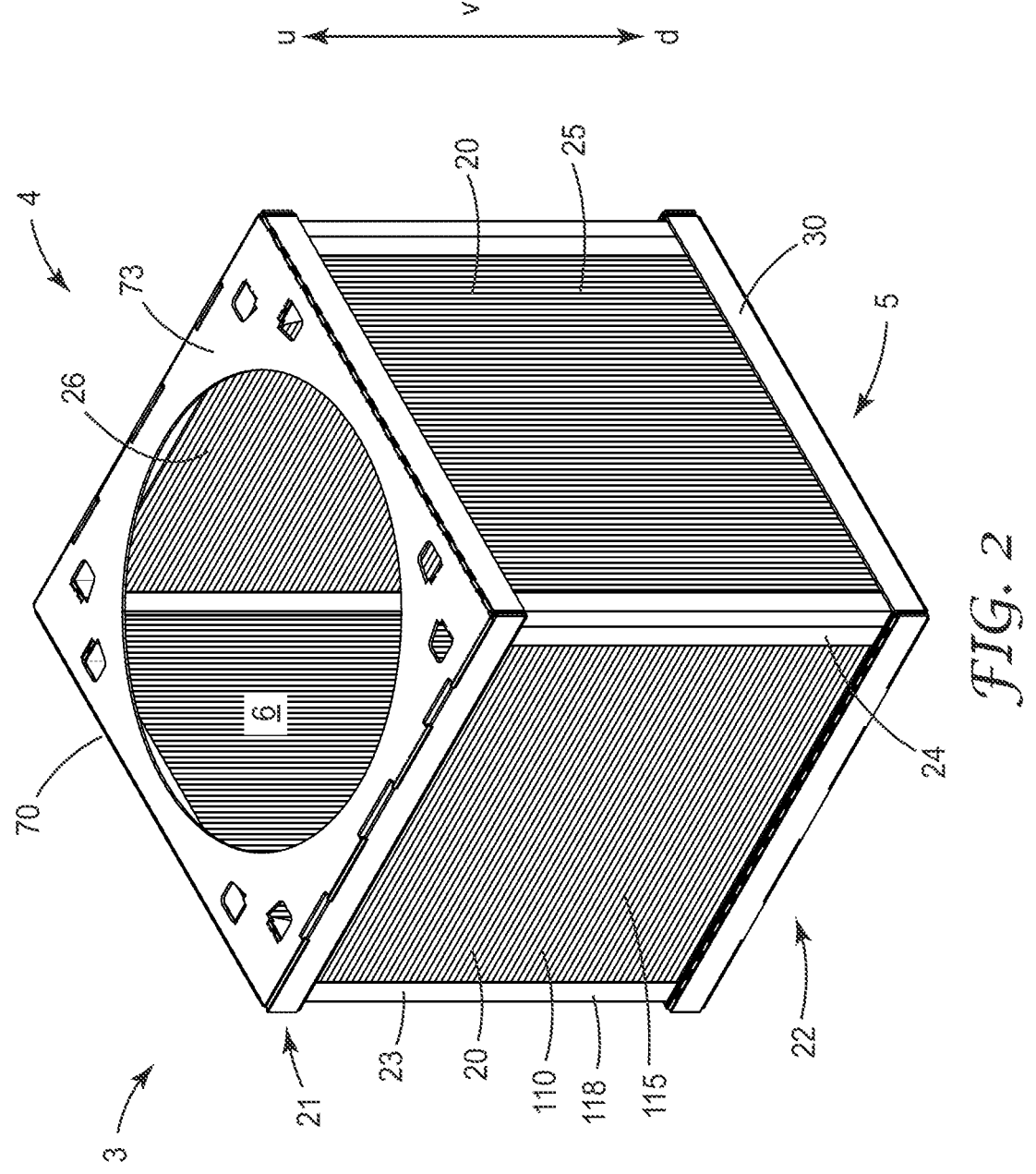
FIG. 2 is a perspective view of an exemplary air-filtration assembly made from assembling a herein-disclosed kit.

Although terms such as "first" and "second" may be used in this disclosure, it should be understood that these terms are used in their relative sense only unless otherwise noted. Terms such as "inward" and "outward" and similar terms are defined with respect to an assembled air-filtration assembly as shown in FIG. 2. Inward denotes a direction toward the geometric center of the air-filtration assembly; outward denotes a direction away from the geometric center. Likewise, terms such as "top", bottom", "upper", lower", "under", "over", "up" and "down", and the like, are defined with respect to an assembled air-filtration assembly as resting on a generally horizontal surface in an orientation as shown in FIG. 2. With the assembly in such a configuration, the vertical axis, and upward and downward directions along this axis, are defined in their normal manner (the vertical axis "v" and upward and downward directions "u" and "d" thereof, are indicated in FIG. 2). For ease of description, this terminology (e.g., referring to inward and outward surfaces of a component, and so on) will be used for components that are in the form of a kit that is not yet assembled to form an air-filtration assembly.

Terms such as upward and downward, unless otherwise specified, will be interpreted as meaning "at least generally" upward and downward, rather than requiring an alignment that is "exactly" vertical in an upward or downward direction. This applies in particular to e.g. tabs that are described as being upwardly-protruding or downwardly-protruding; such terminology embraces tabs that are aligned within plus or minus 45, 35, 25, 15, or 5 degrees of exactly upward or downward. The term "configured to" and like terms is at least as restrictive as the term "adapted to", and requires actual design intention to perform the specified function rather than mere capability of performing such a function.

DETAILED DESCRIPTION

Figure 1:
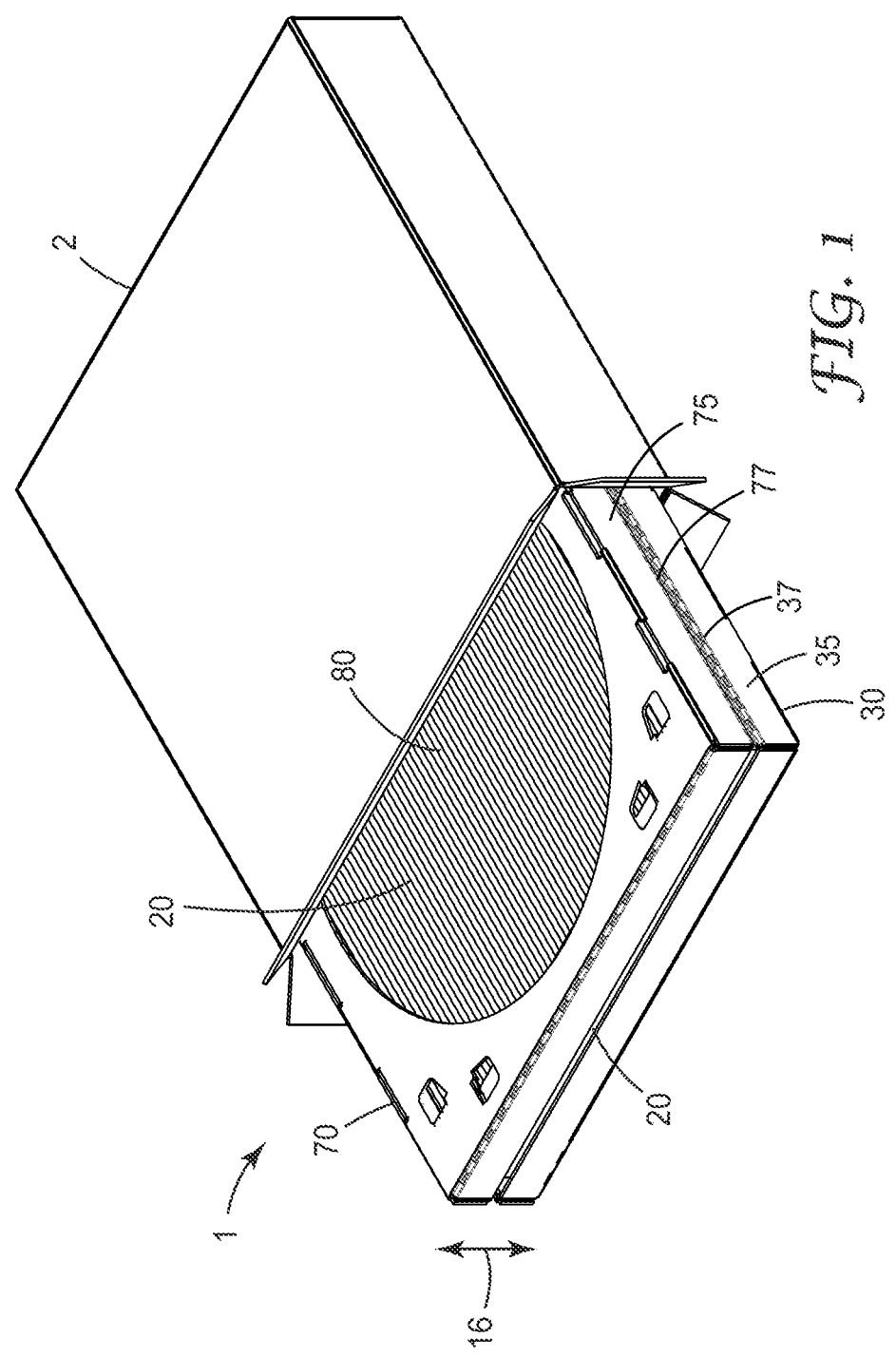
FIG. 1 is a perspective view of an exemplary kit as disclosed herein, shown in a nested condition and partially removed from a box in which the kit was packaged.

An exemplary kit 1 as disclosed herein is shown in FIG. 1. Kit 1 is shown having been partially removed from a box (container) 2 within which kit 1 may be packaged for shipping, storage, presentation for sale, and so on. Other methods of packaging (e.g., shrink-wrapping of kit 1) may be used. As shown in FIG. 1, kit 1 will comprise a base 30, a cover 70, and at least four side panels 20. (Typically, four side panels will be used in the assembled air-filtration assembly; however, in some embodiments, extra or replacement side panels may be included in the kit.) A portion of one such side panel 20 is visible through central opening 80 of cover 70; a portion of another side panel 20 is visible through the gap between upper edge 37 of flange 35 of base 30 and lower edge 77 of flange 75 of cover 70.

At a desired time, kit 1 may be removed from any packaging and assembled into an air-filtration assembly 3 of the general type and arrangement depicted in exemplary embodiment in FIG. 2. Base 30 (shown in isolated view in FIG. 8) will typically be positioned on a generally horizontal surface (e.g. a floor, tabletop, counter, or the like) and will comprise a floor 31 with an upward-facing surface 32 and with an opposing, downward-facing surface 33. Cover 70 (shown in isolated view in FIG. 6) will be positioned above base 30 with a space therebetween, with cover 70 being generally parallel to base 30. Cover 70 will comprise a ceiling 71 with a downward-facing surface 72; ceiling 71 will be a partial ceiling by way of comprising a central aperture 80 as evident in FIG. 6. Typically, base 30 and cover 70 will both be square and will be congruent with each other; that is, they will exhibit the same overall size, shape, and perimeter dimensions when viewed along the vertical axis of the air-filtration assembly, as evident in FIG. 2.

Air-filtration assembly 3 will further comprise four side panels 20 that are positioned in the space between cover 70 and base 30 as shown in FIG. 2. At least one of the side panels 20 will be a framed air filter 110 as shown in exemplary embodiment in FIG. 4. In various embodiments, two or three of the side panels may be a framed air filter. (Any side panel that is not a framed air filter may be e.g. a non-air-transmissive panel that serves as a structural component of the assembly.) However, in many embodiments, all four of the side panels 20 will be framed air filters. The terms side panels and framed air filters will be used herein somewhat interchangeably; it will be understood that in any air-filtration assembly, from one to four such side panels may be in the form of a framed air filter.

Figure 4:
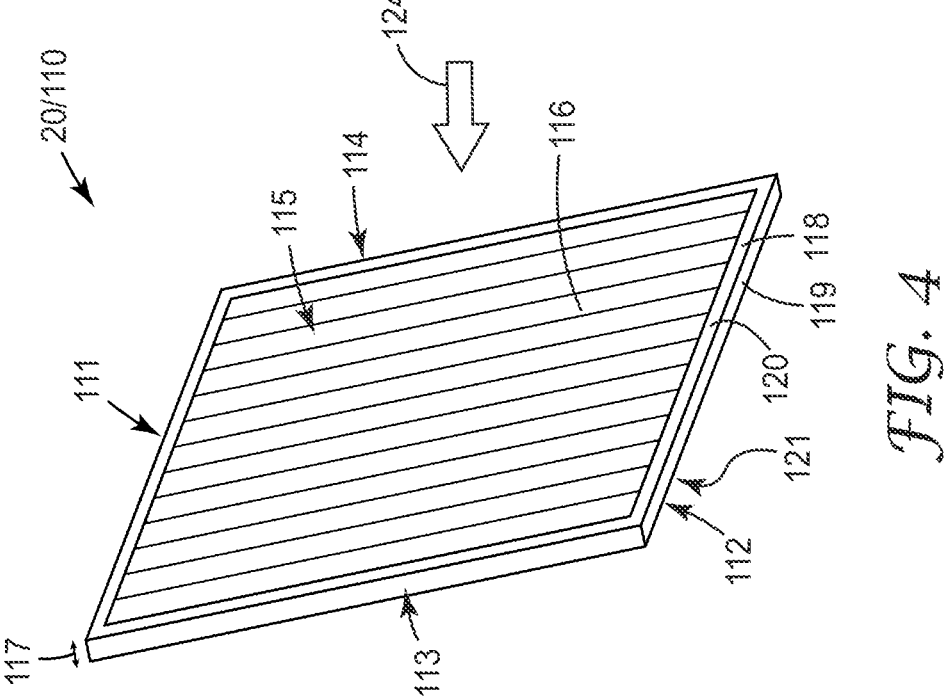
FIG. 4 is a perspective view of an exemplary framed air filter that can serve as a component of a herein-disclosed kit.

Each side panel 20, as installed in air-filtration assembly 3, will comprise an outward side 25 and an inward side 26, and an upper edge 21, a lower edge 22, and first and second opposing side edges 23 and 24, as indicated in FIG. 2. For a side panel 20 that is a framed air filter 110 as shown in FIG. 4, these edges will respectively correspond to upper edge 111, lower edge 112, and first and second opposing side edges 113 and 114 of air filter 110. The lower edges 22 of the side panels will be abutted against the upward-facing 32 surface of floor 31 of base 30; the upper edges 21 of the side panels will be abutted against the downward-facing surface 72 of partial ceiling 71 of cover 70. A first side edge 23 of a side panel 20 will be abutted against a side edge of a first nearest-neighbor side panel and second, opposing side edge 24 of the side panel 20 will be abutted against a side edge of a second nearest-neighbor side panel. In many embodiments the four side panels 20 will be arranged in a "pinwheel" fashion (as in FIG. 2) when viewed along the vertical axis of the assembly rather than with an opposing pair of side panels being outwardly flanked by a second opposing pair of side panels. Such a "pinwheel" arrangement will allow the side panels to form (again, when viewed along the vertical axis) a square shape, in contrast to a non-square, rectangular shape which would be formed by an inward/outward "flanking" arrangement of pairs of side panels.

When assembled in this manner, the base 30, cover 70, and four side panels 20 will collectively form an air-filtration assembly 3 that is in the shape of a cuboid and that defines a filtered-air cavity 6 within the assembly, as evident in FIG. 2. The term "air-filtration assembly" is defined herein as meaning a completed, ready-for-use assembly (needing only a box fan to be disposed atop the assembly and operated, in order to filter air); such terminology does not encompass a structure that is described as being only partially complete; in particular, a structure that is said to need additional components, e.g. sealing tape or the like, in order to become functional as an air-filtration device.

In some embodiments, the cuboid may be a cube (e.g. as in FIG. 2), e.g. if the side panels are each square (e.g., if the side panels are in the form of 20"×20" framed air filters). However, the term cuboid embraces rectangular parallelepipeds, which may be the case e.g. if the side panels have a greater length than height (e.g., if the side panels are in the form of 20" L×14" H framed air filters). In such cases, the cuboid will not be an exact cube, but rather will exhibit a height that is less than the length of the sides of the cuboid.

Air-filtration assembly 3 will define a filtered-air cavity 6 within assembly 3. As shown in exemplary manner in FIG. 3, the operating of a box fan 7 disposed atop cover 70 of assembly 3 will cause ambient air to be pulled through one or more air filters/side panels in the general manner indicated by arrows 11, so that this air is filtered thereby, and enters into filtered-air cavity 6. The continued operation of box fan 7 will cause the filtered air to be evacuated from cavity 6 and dispersed generally upward and outward into the ambient atmosphere in the general manner indicated by arrow 12.

Air filtration assembly 3 as positioned in the general manner shown in FIG. 2 will comprise an upper side 4 and a lower side 5. Assembly 3 will be upwardly-open by virtue of the above-noted central aperture 80 that is provided in ceiling 71 of cover 70. Here and elsewhere, by aperture is meant a through-aperture that extends completely through the item in question (here, ceiling 71). Central aperture 80 is thus air-transmissive to allow filtered air to exit cavity 6 therethrough in large quantities. By air-filtration assembly 3 being upwardly-open is meant that at least 65% of the nominal (overall) area of ceiling 71 is occupied by aperture 80; such arrangements are ample (when assembly 3 is coupled with an appropriate box fan) to allow sufficient airflow therethrough to enable assembly 3 to provide filtered air at an adequate rate. In various embodiments, aperture 80 may occupy at least 70, 75, 80, or 85% of the nominal area of ceiling 71. In further embodiments, aperture 80 may occupy at most 95% of this nominal area. In various embodiments, aperture 80 may have an area of from 500 square cm to 4000 square cm.

Air-filtration assembly 3 will be a horizontally-closed assembly. By this is meant that there are no major air-leakage pathways (e.g., a pathway similar to the above-described aperture 80 of cover 70) that would allow significant flow of ambient air generally horizontally into filtered-air cavity 6. In other words, no significant amount of ambient air will enter filtered-air cavity 6 except by passing through the filter media of the one or more air filters. (In various embodiments, any such air-entry leakage pathways, if present, may collectively occupy no more than 2, 1, or 0.5 square cm, in total.)

Kit 1 is thus configured so that an air-filtration assembly 3 constructed therefrom (e.g. by an end user) will have no major air-entry leakage pathways. Detailed discussions herein will make it clear that any of various air-leakage pathways that may exist in assembly 3 (e.g., slit leaks 13 between side edges of side panels 20, slit leaks 14 between an edge flange of cover 70 and a top edge 21 of a side panel, and/or slit leaks 15 between an edge flange of base 30 and a lower edge 22 of a side panel, all as indicated in generic representation in FIG. 3), will be minor and will not negatively impact the filtration performance of air-filtration assembly 3. This is the case even though assembly 3 need not necessarily be "hermetically" sealed e.g. by way of applying adhesive tape to seal any and all such potential minor leakage pathways.

The present approach relies on an appreciation that an air-filtration assembly 3 of the general type disclosed herein can be used in recirculation mode. That is, the assembly can be disposed e.g. within a room or other enclosure and operated so that ambient air from the room is repeatedly drawn into assembly 3 and filtered and returned back into the room in the form of filtered air. As such, the "absolute" filtration performance of the assembly (as represented by, e.g., meeting a HEPA standard) will typically be less important than the quantity of air that can be filtered in combination with the absolute filtration performance. By way of an example, an air-filtration assembly that achieves HEPA performance (e.g. removal of at least 99.97% of particles of diameter 0.3 microns), but that delivers the filtered air at a very low flowrate (e.g. less than 0.2 cubic feet of air per minute), would have little effect on the air quality in a room of e.g. 1000 cubic feet in size.

The parameter known as the Clean Air Delivery Rate (CADR, measured according to procedures specified in ANSI/AHAM AC-1) is a more useful figure of merit in characterizing the ability of an air-filtration assembly, operating in recirculation mode, to positively impact the air quality of a room. The CADR captures the overall performance of an air-filtration assembly, in terms of the quantity of air that can be filtered along with the absolute filtration performance in removing particles from that air. A CADR is measured separately, for dust, pollen, and smoke, which are representative of particles that are large, medium and small in size, and is reported in terms of the volumetric flow (in cubic feet per minute (CFM)) of air that has had these particles removed therefrom.

Figure 3:
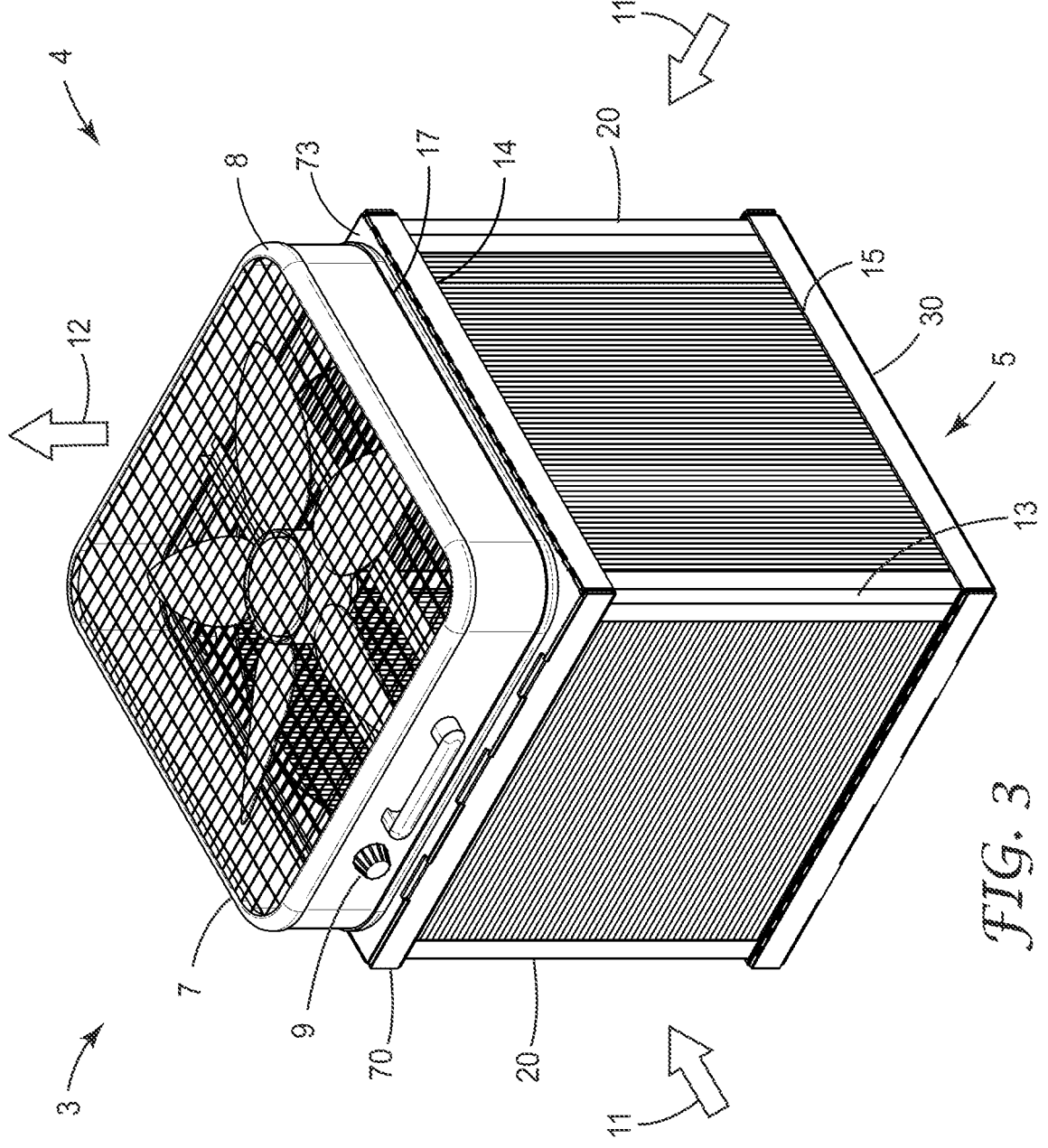
FIG. 3 is a perspective view of an exemplary air-filtration assembly with a box fan disposed on the air-filtration assembly.

The present investigations have revealed that an air-filtration assembly of the general type disclosed herein, when operated in conjunction with a box fan as depicted in FIG. 3, can achieve a CADR in a range of e.g. 100-400 CFM, for dust, pollen, and smoke. Such performance is appropriate for many rooms and enclosures (e.g. classrooms, offices, rooms of residential houses and apartments, and the like). Such performance assumes the use of appropriate air filters, e.g. electret-functionalized air filters that exhibit good filtration characteristics as discussed later herein; the exact CADR will of course depend on the speed at which the box fan is operated.

In the present investigations, such performance has been demonstrated with numerous working example prototype air-filtration assemblies. Notably, the performance has been found to not depend significantly on whether or not the air-filtration assembly is treated (e.g. with adhesive tape) to occlusively (hermetically) seal the various potential air-entry slit-leakage pathways mentioned above. That is, the present investigations have shown that when an air-filtration assembly as disclosed herein is operated in recirculation mode, there is little or no need to hermetically seal the assembly to substantially eliminate all such potential air-entry leakage pathways. Rather, the presence of a small number of minor air-entry leakage pathways (e.g. the presence of a few slit-leaks that collectively amount to e.g. less than 2 square cm in size) has been found to not unacceptably affect the filtration performance. In other words, while the presence of a very large entry pathway for unfiltered air (e.g. on the order of several tens of square cm in size) would be expected to negatively affect the air-filtration performance, the presence of a few small air-leakage pathways (e.g. slit leaks between various surfaces of items that are abutted against each other) has been found to have very little deleterious effect on the air filtration that can be achieved.

This is due in part to the large total area of air-filter media that can be used in comparison to the total number and size of slit-leaks. This is particularly true of if all four side panels of the assembly are air filters. Four such nominal 20"×20" air filters may approach e.g. 10000 square cm in area; if the filter media is pleated the total filter-media area may be greater still. With such a large filtration area for ambient air to pass through (and noting that many electret-based filter media exhibit a very low resistance to airflow), it seems to make little difference if, e.g., a few small slit leaks are present. It is also noted that operating the box fan as disclosed herein (i.e. with the box fan operating so as to draw ambient air into the assembly through the air filters and to exhaust filtered air outward through the fan) creates a slight negative pressure in the filtered-air cavity 6 of the assembly. This acts to draw the side panels, base and cover slightly toward each other, which further reduces the size and effects of any slit leaks that may be present.

This being the case, the herein-disclosed arrangements provide that, at least in some embodiments, kit 1 can be assembled into an air-filtration assembly 3 without the use of adhesive tape to secure the side panels to the base and cover; specifically, without the application of adhesive tape to the air-filtration assembly to occlusively/hermetically seal any slit leaks between the side panels and the base and cover. Such an arrangement will be referred to herein as the side panels being in non-occlusive, disconnectable contact with the base and with the cover. By disconnectable contact is meant that the side panels can be separated from the base and cover without damaging or destroying the base and cover, and without having to remove any fastener (whether adhesive tape, or any mechanical fastener such as hook-and-loop, staples, etc.) in order to perform the separation. Such arrangements can allow that when an air-filtration assembly 3 has been used for such time as the air filters need to be replaced, the base and cover can be removed from the air filters without destroying or damaging the base or cover. The spent air filters can then be disposed or recycled and new air filters can be used with the same base and cover. The base and cover thus can be used for a considerable length of time (e.g. one or more years), with successive sets of air filters.

In some embodiments, a cover, base, and/or side panel for use in such a kit and resulting assembly, may comprise one or more gaskets that are configured to further minimize the presence and/or size of any minor slit leaks. Such a gasket may take the form of e.g. a strip of compliant, resilient material such as foam rubber or the like, and may be mounted (e.g. at the factory) on a desired location of a cover, base, and/or side panel, in any desired manner. In some particular embodiments, such a gasket may be a strip of compliant, resilient material with an adhesive on a rear surface, to allow the gasket to be adhesively bonded to a desired surface of a cover, base, and/or side panel. Suitable locations for such a gasket may be e.g. on an inward face of an edge flange of a cover or base (e.g. so that an outward surface of a framewall of a framed air filter/side panel can be abutted against the gasket), and/or on a downward-facing surface 72 of ceiling 71 of cover 70 (so that an upward-facing surface of a framewall of a framed air filter can be abutted against the gasket) and/or on an upward-facing surface 32 of floor 31 of base 30 (so that a downward-facing surface of a framewall of a framed air filter can be abutted against the gasket). Gaskets may be positioned in any or all of these locations.

Any such instance, in which e.g. an adhesive is used to hold a gasket in place on a component (e.g. a base or cover) of kit 1 as provided from the factory, differs from an adhesive tape being applied to an air-filtration assembly 3 as constructed in order to seal against a slit leak. Any such instance will accordingly be considered to provide disconnectable contact in the general manner discussed above. However, it is emphasized that the present investigations have found that excellent air-filtration performance can be achieved by the arrangements disclosed herein, without the need for any such gaskets. Thus in some embodiments, no such gaskets of any kind may be present on any component of kit 1 as supplied from the factory and no such gaskets of any kind may be present in air-filtration assembly 3 as constructed by an end user from such a kit.

In at least some embodiments, an air-filtration assembly as disclosed herein is disassemblable, meaning at least that the base and cover can be separated from the four side panels without damaging or destroying the base and cover so that at least the base and cover can be used again if desired. In some embodiments, all the components of the entire assembly air-filtration assembly, including the four side panels (e.g. four framed air filters) can all be separated from each other, e.g. so that the entire assembly can be dismantled and moved to a new location and reassembled. It is noted that expressions such as e.g. a base or cover being removed or separated from side panels, and similar terminology, are used in a commutative sense, and encompasses actions of removing a base or cover from a side panel, removing a side panel from a base or cover, and so on, regardless of which entity is actually grasped and moved so as to separate it from another entity.

In some embodiments, in the finished air-filtration assembly 3 the side edges of the various side panels may be adhesively bonded to each other e.g. with adhesive tape, even if the base and cover are non-occlusively, disconnectably connected to the lower and upper edges of the side panels in the manner described above. An end user may carry out such a procedure if desired, e.g. if it is desired that the air-filtration assembly be very robust. The presence of any such adhesive tape on the side panels/air filters may be of no consequence since spent air filters will typically be disposed or recycled after use, and it may not matter if they cannot be separated from each other or will be damaged in the process. However, in some embodiments, the various side panels may be in non-occlusive, disconnectable contact with to each other in similar manner as described above.

Thus in some embodiments, the upper edges of the side panels/air filters may be merely abutted against the cover, the lower edges of the side panels/air filters may be merely abutted against the base, and the side edges of the side panels/air filters may be merely abutted against side edges of neighboring side panels/air filters, in the air-filtration assembly 3 as constructed. Such arrangements can allow kit 1 to be assembled into air-filtration assembly 3 in the complete absence of any adhesive tape (or, in general, any adhesive or mechanical fastening system). This can simplify the process of constructing assembly 3 and can allow the assembly to be constructed in a very short time, e.g. in five minutes or less. Such arrangements can also provide that the entire assembly 3 is disassemblable in the sense that not only can the base and cover be disconnected from the side panels, but also, the side panels can be individually disconnected from each other without the necessity for e.g. removing any adhesive tape.

As noted, kit 1 and assembly 3 constructed therefrom, will comprise four side panels 20. At least one of the side panels (often, all four side panels) will be a framed air filter. An exemplary framed air filter 110 that may serve as a side panel 20 is shown in isolated view in FIG. 4. Framed air filter 110 will comprise a perimeter frame 118 that is present on all four edges (111, 112, 113, and 114) of the air filter, and will comprise an air filter media 115 that is bounded on all four sides by frame 118. In some embodiments, filter media 115 will be pleated so as to comprise pleats 116. By this is meant that media 115 has been folded into rows of generally parallel, oppositely oriented folds that provide alternating pleats and valleys on both sides of the filter media. Various parameters of the pleated media (e.g. pleat spacing, pleat height, and so on) can be chosen as desired. Air filter media 115 and framed air filter 110 will have a rectangular shape; in many embodiments this shape will be square so that the resulting air-filtration assembly 3 is in the shape of a cube.

A framed air filter 110 may comprise any suitable air filter media. For use e.g. in treating air in residences, classrooms, offices, and so on, an air filter media with appropriate filtration characteristics will be used. That is, in some embodiments the filter media may be an electret-functionalized filter media that exhibits good filtration characteristics for small particles (e.g. smoke, pollen, aerosols, and so on). Filter media that are based on e.g. fiberglass fibers with large interstitial spaces in between (which, when used e.g. in HVAC systems, merely serve to remove gross debris, e.g. cat fur and the like) will have very little affect on e.g. airborne fine particles, aerosols, smoke, pollen, and so on. Thus in many embodiments, an electret-functionalized filter media is preferred. In many embodiments the filter media may exhibit a relatively low resistance to airflow therethrough, which can help to minimize or negate the effect of any potential air-entry slit leaks as discussed earlier herein.

Accordingly, for the purposes herein, the term "air filter" is defined as an air filter whose filtration media exhibits an initial Quality Factor (QF) of at least 0.50 when tested against airborne DOP particles of diameter approximately 0.185 microns delivered at a face velocity of approximately 14 cm/s (corresponding to a flowrate of approximately 85 liters/minute) in accordance with the procedures disclosed in U.S. Pat. No. 8,240,484, which is incorporated by reference in its entirety herein. As evident from the descriptions in the '484 patent, the Quality Factor is a figure of merit that takes into account the ability of a filter media to filter airborne particles of a particular size, as well as taking into account the airflow resistance of the filter media. In various embodiments, an air filter as disclosed herein may exhibit an initial Quality Factor of at least 1.0, 1.5, or 2.0. Air filters are also sometimes characterized by a "Minimum Efficiency Reporting Value" (MERV), as described in the '484 patent. In various embodiments, an air filter as disclosed herein may exhibit a MERV of at least 5, 9, or 13. (In many embodiments, a MERV rating of approximately 13 may be preferable.) In further embodiments, such an air filter may have a maximum MERV of 16.

In some embodiments, the filter media of an air filter may be, or include, a nonwoven material. Nonwoven webs which may be used as, or as a layer, of, the filter media can be a high loft spunbond web, such as described, for example, in U.S. Pat. No. 8,162,153. In some embodiments, the filter media can be, or include, a relatively low loft spunbond web, such as those described in U.S. Pat. No. 7,947,142. In some embodiments, an electrostatic charge is optionally imparted into or on to material(s) of the filter media so that the filter media can include, or be, an electret nonwoven web. Electric charge can be imparted to the filter media in a variety of ways as is well known in the art, for example by hydro-charging, corona charging, etc. (e.g. as described in the U.S. '142 patent). Pleats can be formed in a filter media (e.g. a charged filter media) using various methods and components as are well known in the art, for example those described in U.S. Pat. Nos. 6,740,137 and 7,622,063.

In some embodiments, the filter media may include one or more reinforcing layers or entities comprising e.g. an open cell structure, a porous media, a nonwoven scrim, a netting, a wire mesh, or any such structure(s), which may be provided along with (e.g., bonded to) a layer that performs the actual filtration and which may be made of any suitable material. Such an entity may be e.g. bonded only to the pleat tips of the pleated media; or, it may be bonded to a major surface of the media and then pleated along with the media so as to be in contact with the panels of the pleats as well as with the pleat tips. In some embodiments, the pleated filter media may comprise reinforcing entities in the form of a set of extruded reinforcing filaments of the general type described in U.S. patent Ser. No. 11/253,807 and in U.S. Patent Application Publications 2021/0229022 and 2021/0229023.

In many embodiments, a framed air filter 110 that is used as a side panel 20 in the manner disclosed herein may comprise a perimeter frame that is generally U-shaped; such frames are generally known as channel frames and are disclosed e.g. in U.S. patent Ser. No. 11/253,807, which is incorporated by reference in its entirety herein for this purpose. If the airflow into the framed air filter is in the direction indicated by arrow 124 of FIG. 4, each of the four sections of the channel frame (on the four edges of the air filter) will comprise an outward (upstream, in terms of airflow) framewall 120, an inward (downstream, in terms of airflow) framewall 121 that is generally parallel to the outward framewall, and a side framewall 119 that extends between the outward and inward framewalls, all as indicated in FIG. 4.

In some embodiments, a framed air filter that is used as a side panel 20 in the manner disclosed herein may comprise a perimeter frame that is a so-called "pinch" frame of the general type disclosed in U.S. Provisional Patent Application 63/00013, in the resulting International (PCT) Patent Application published as WO 2021/191797, and in the resulting U.S. patent application Ser. No. 17/909,712, all of which are incorporated by reference in their entirety herein. In general, a suitable pinch frame will comprise four frame sections (each of which is on one of the four edges of the air filter), each such frame section having a pair of framewalls that meet at an outward corner of the frame section at an angle that is close to 90 degrees (e.g. in the manner of framewalls 40 and 30 that meet at outward corner 110 of the pinch frame depicted in FIG. 2 of the above-cited WO '797 publication). Typically, one such framewall (e.g. framewall 30 of WO '797) will be a side framewall that is abutted against a ceiling or floor of a cover or base in the manner disclosed herein, and the other framewall (e.g. framewall 40 of WO '797) will be an outward/upstream framewall that is abutted against an inward face of an edge flange of a cover or base in the manner disclosed herein. The meeting of such framewalls at an approximately 90 degree angle will facilitate the abutting of one such frame sidewall against a ceiling or floor of a cover or base and the abutting of the other (e.g. upstream) frame sidewall against an inward face of an edge flange of the cover or base. Frames with framewalls that do not meet at an outward corner in this general manner (e.g., that meet at an angle that is significantly greater from 90 degrees, as with the frames depicted in U.S. Pat. No. 9,174,159) may, in general, be less suitable for the arrangements disclosed herein, although such frames may be used if desired.

As discussed in detail later herein, in some embodiments kit 1 may be provided in the form of a nested stack. This will typically be achieved because of the way an unnested stack of four side panels (e.g. framed air filters) can be fitted within nesting spaces defined by the edge flanges of the cover and base as discussed later herein. That is, with a kit 1 in the form of a nested stack, the nesting may be primarily achieved by disposing the side panels into nesting spaces defined by the flanges of the cover and/or base; the framed filters themselves need not, and typically will not, be nested with each other in the manner of e.g. the nested air filters as depicted in FIG. 4 of the above-cited U.S. '159 patent.

In some embodiments, a framed air filter may have a preferable orientation for airflow through the filter media (air filters with "pinch" frames often have such a preferable orientation). If so, the framed air filter may be marked (e.g. with one or more arrows) to denote the inward-outward orientation in which the filter should be installed in the base and cover. In some embodiments, a framed air filter may be used that can be installed in the base and cover without regard to the inward-outward orientation of the air filter.

In some embodiments, one or more of the four side panels 20, e.g. in the form of one or more framed air filters 110, may be of a fixed, permanent size. In other embodiments, one or more such air filters and/or filter media thereof may be expandable. In such a case, an air filter 110 as packaged in kit 1 may be of a smaller size (e.g. with the pleats of the air filter collapsed together into a compacted condition) and/or may be only partially framed, with the end user being instructed to expand the air filter to its final, end-use size (and to finalize the frame if necessary) to use the expanded air filter in the air-filtration assembly. In some embodiments, a pleated media may be provided to an end user in a collapsed condition, and expanded and inserted into a frame that is itself not expandable or collapsible. In some embodiments, an air filter may comprise a reusable frame that can be used with a series of pleated media that can be installed (after being expanded if necessary) into the reusable frame. Various air filters that are expandable, and/or that use expandable filter media, and/or that comprise reusable frames that accept filter media, are described e.g. in U.S. patent Ser. No. 10/406,472, 10,994,235, and 11,192,059, and in U.S. Provisional Patent Application 63/292,623, all of which are incorporated by reference herein in their entirety.

Figure 5:
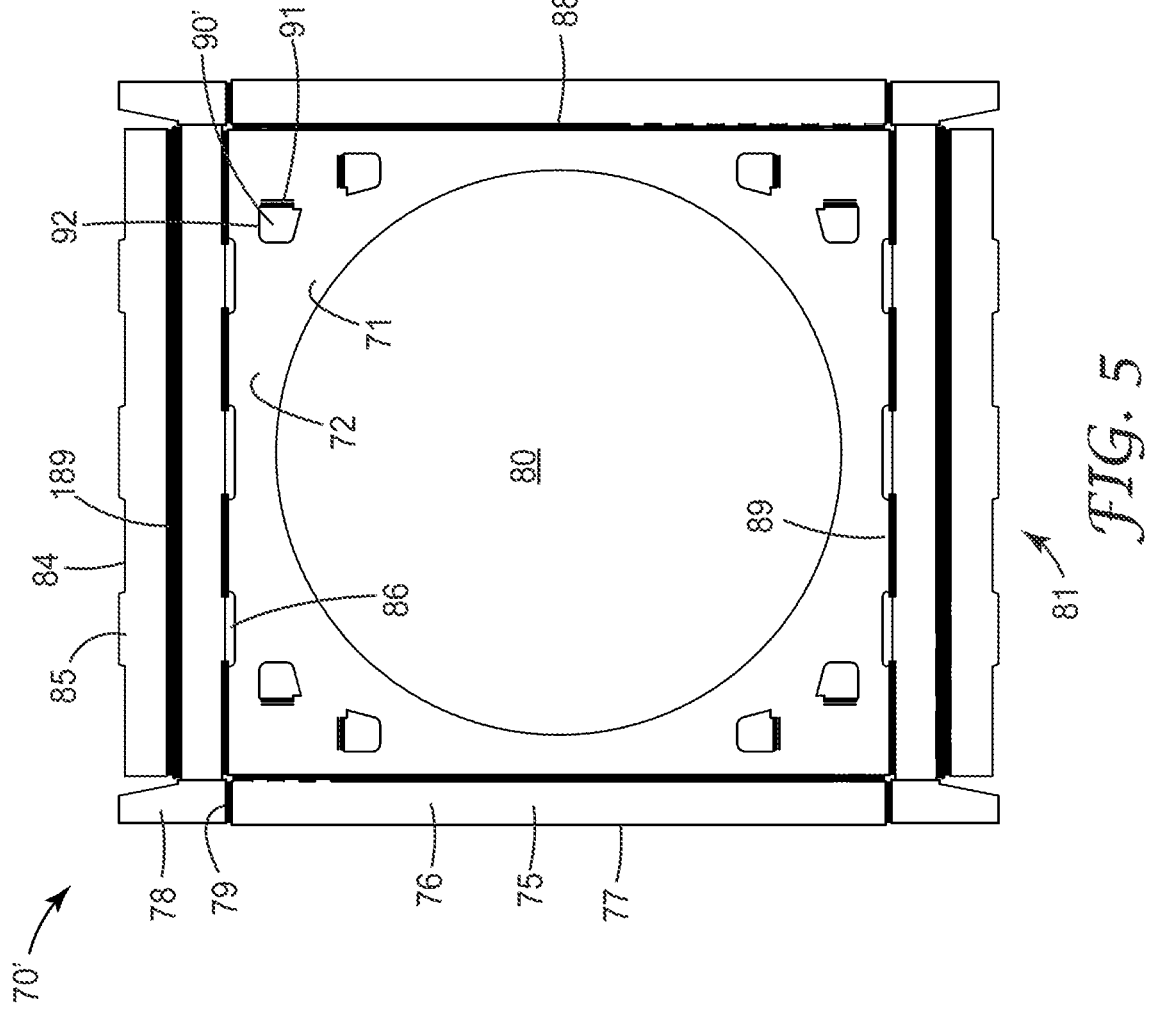
FIG. 5 is a plan view of an exemplary blank that can be folded to form a cover that can serve as a component of a herein-disclosed kit.

In some embodiments, one or both of base 30 and cover 70 of kit 1 may be formed from a flat piece of material that is cut to the appropriate size and shape so that various edge flanges of the material can be folded to form base 30 and cover 70. Such a flat piece of material (which may also comprise various through-cuts, hinged connections, and so on, for various purposes as discussed in detail later herein) is customarily referred to as a blank. An exemplary blank 70' is depicted in FIG. 5; this blank can be manipulated to form an exemplary cover 70 shown in FIG. 6. Similarly, an exemplary blank 30' is depicted in FIG. 7 that can be manipulated to form an exemplary base 30 shown in FIG. 8. (For convenience, areas of such blanks that can be manipulated, e.g. folded, to form various features of the finished base or cover, will occasionally be referred to by the same reference numbers as the feature that the area forms.)

Figure 6:
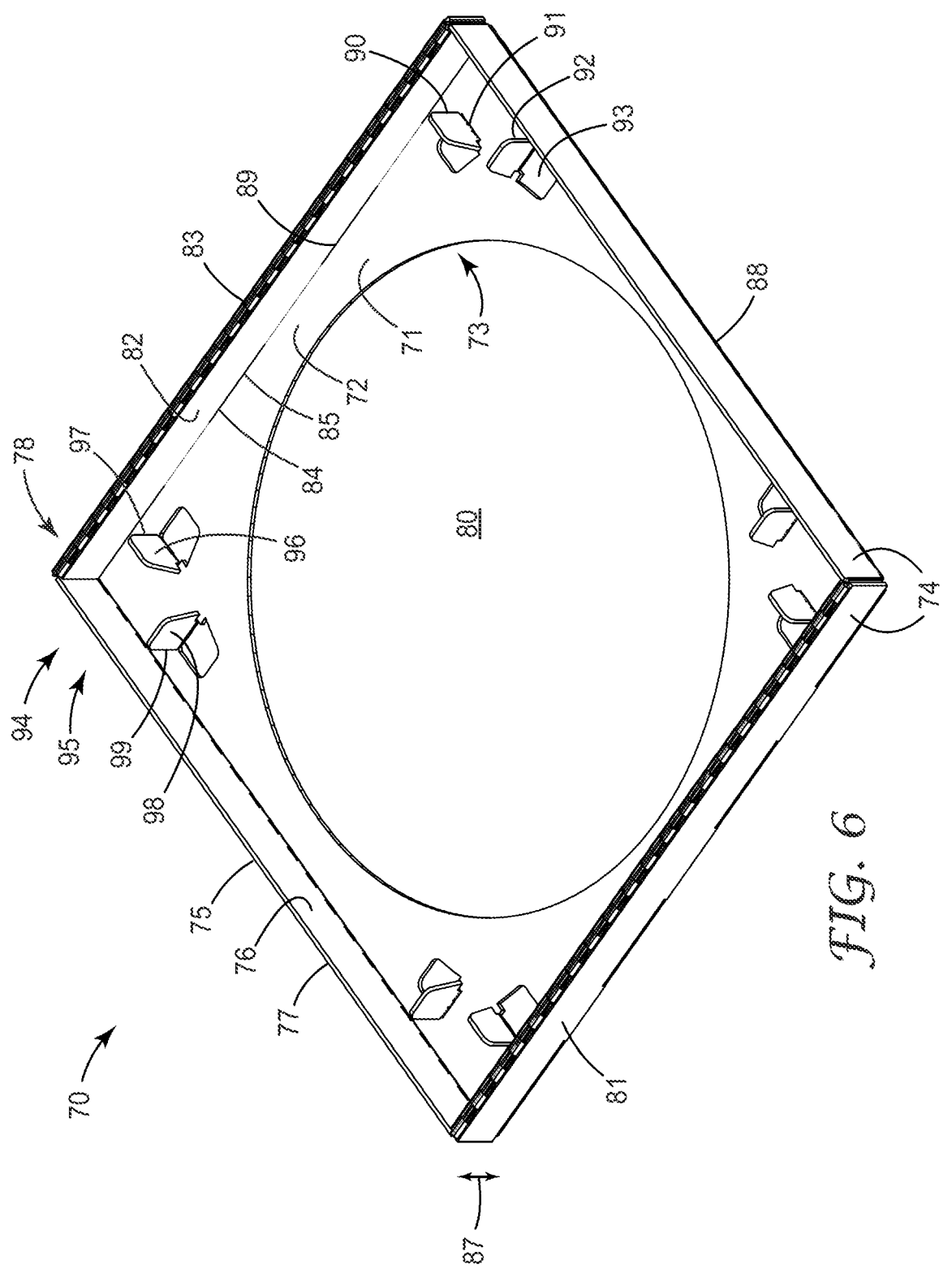
FIG. 6 is a perspective view, from underneath, of a cover formed from the blank of FIG. 5.
Figure 7:
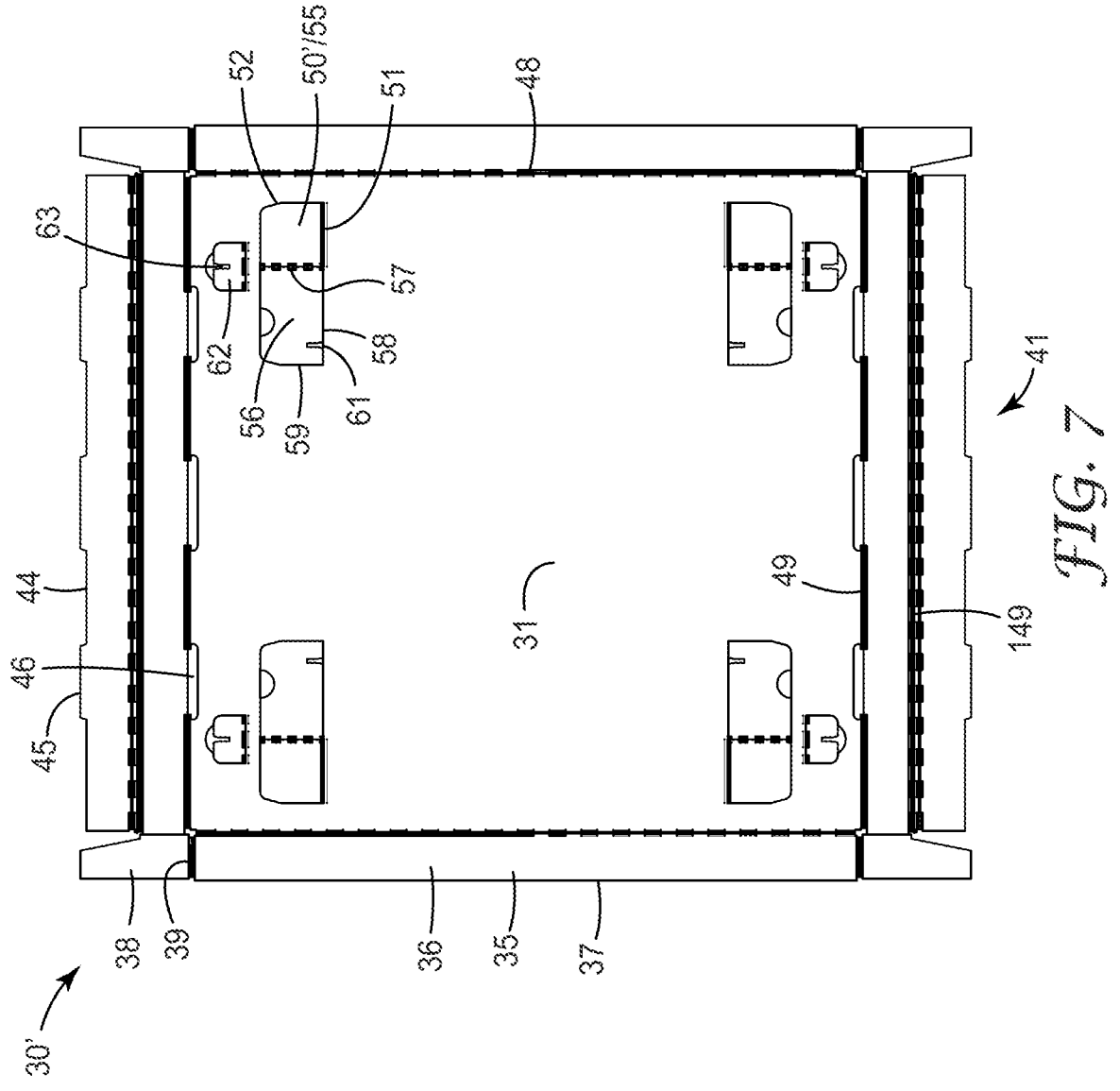
FIG. 7 is a plan view of an exemplary blank that can be folded to form a base that can serve as a component of a herein-disclosed kit.
Figure 8:
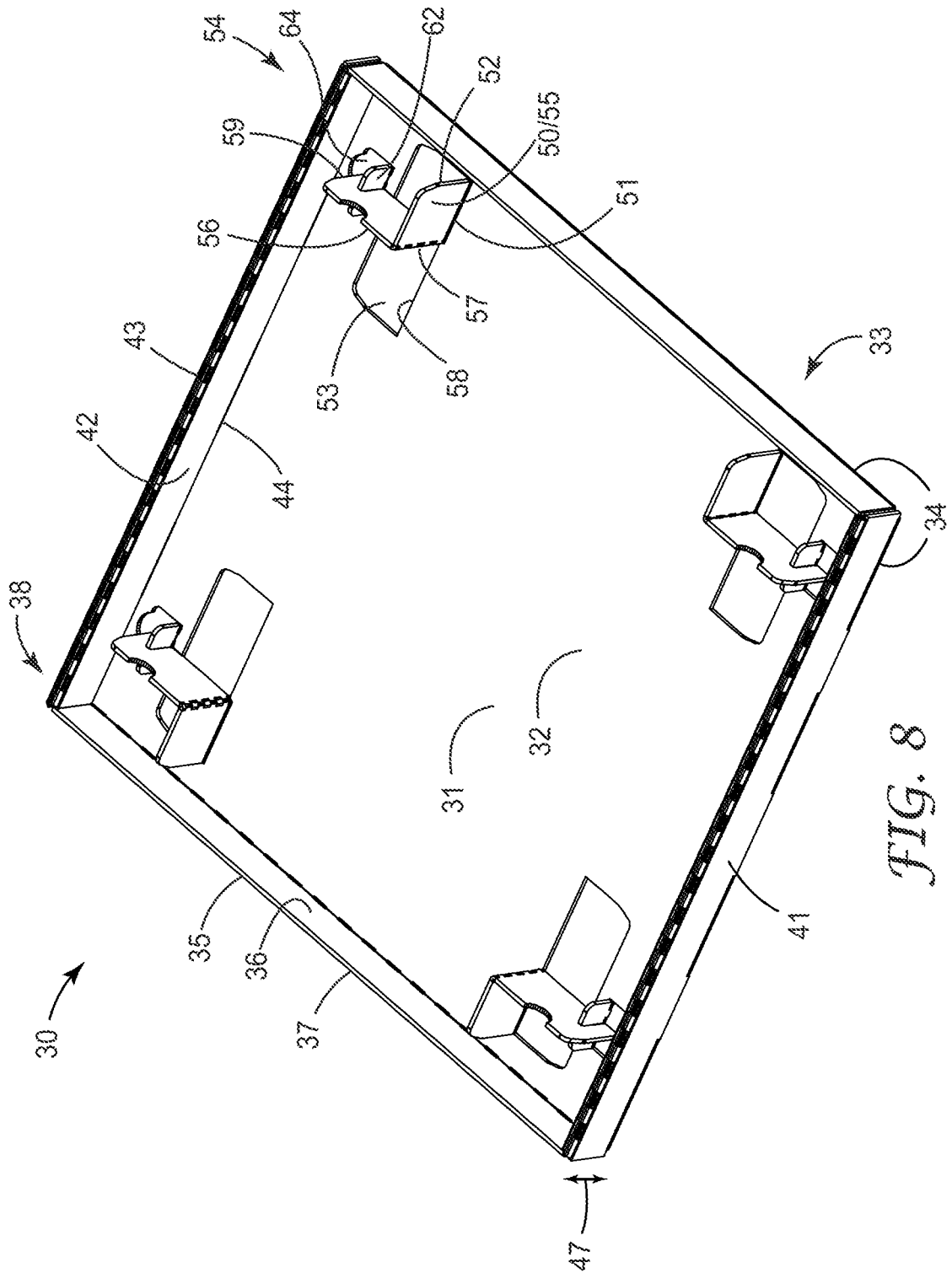
FIG. 8 is a perspective view, from above, of a base formed from the blank of FIG. 7.

As illustrated in FIG. 6, in some embodiments each of the four edges 34 of base 30 will comprise an upwardly-extending edge flange that extends along the entire length of the edge. These edge flanges will define the thickness of base 30 (as indicated by arrow 87 in FIG. 6) in the vertical direction. Similarly, as illustrated in FIG. 8, in some embodiments each of the four edges 74 of cover 70 will comprise a downwardly-extending edge flange that extends along the entire length of the edge. These edge flanges will define the thickness of cover 70 (as indicated by arrow 47 in FIG. 8) in the vertical direction. The manipulations of blanks 30' and 70' to equip base 30 and cover 70 with edge flanges will be done at the factory so that base 30 and cover 70 as supplied to an end user in a kit 1 (as in the exemplary depiction of FIG. 1) will have edge flanges in the general form in which they appear in FIGS. 6 and 8. That is, an end user will not have to perform any manipulations to form these flanges; the user need only manipulate certain areas of the cover and base to form tabs as discussed in detail later herein.

Kit 1 will be configured so that in the air-filtration assembly 3 produced therefrom, each of the upwardly-extending flanges of the four edges 34 of base 30 will outwardly abut an outward face of at least a lower edge 22 of at least one of side panels 20; and, each of the downwardly-extending flanges of the four edges 74 of cover 70 will outwardly abut an outward face of at least an upper edge 21 of at least one of side panels 20, as is evident in the exemplary design shown in FIG. 2. In other words, the outward faces of upper and lower edges 21 and 22 of side panels 20 will respectively inwardly abut inward faces of the downwardly-extending flanges of cover 70 and the upwardly-extending flanges of base 30.

In some embodiments, such an edge flange may have a vertical height of from at least 10, 20, 30 or 40 mm to at most 75, 65 or 55 mm (with the thickness of the base or cover thus being defined accordingly). This height will be measured from the bottom surface of the base or the top surface of the cover. Any such set of four edge flanges will define a nesting space therein; the height of the nesting space will be measured from the upward surface of the base or the downward surface of the cover. In other words, for a cover or base, the height of the nesting space of the cover or base will be the height of the flanges minus the thickness of the floor of the base or of the ceiling of the cover. This nesting space will provide a space to accommodate side panels 20 of kit 1 as discussed below.

In some embodiments, base 30, cover 70, and side panels 20 will provided as a kit 1 that is in the form of a stack in which the four side panels are sandwiched between the base and the cover in the general manner shown in FIG. 1. In some such embodiments, the stack can take the form of a nested stack that exhibits a total thickness (indicated by arrow 16 in FIG. 1) that is less than 80% of the combined individual thicknesses of the base, the cover, and the four side panels. (As noted above, the thickness of the base and the cover are defined by the flanges of the base and cover.) This ratio of the total thickness of the stack to these combined individual thicknesses is defined herein as a nesting ratio. In various embodiments, a kit 1 in the form of a nested stack may exhibit a nesting ratio that is less than 70, 60, or 50%. By way of a specific example, if a nested stack exhibits a total thickness of 90 mm, the base and cover exhibit individual thicknesses of 50 mm, and the four side panels exhibit individual thicknesses of 22 mm, the nesting ratio will be 90/(50+50+4×22), or approximately 48%. It will be appreciated that providing kits 1 in the form of nested stacks in this manner can allow significant savings in the cost of shipping, storage, and so on, of kits 1.

Upwardly-extending edge flanges of base 30 can be produced (in the factory) by folding edge segments of blank 30' along hinged connections; similarly, downwardly-extending edge flanges of cover 70 can be produced by folding edge segments of blank 70' along hinged connections. Starting with base 30, in some embodiments, edge sections 35 (as shown in FIG. 7) of base blank 30' can be folded upward along hinged connections 48 to form first and second opposing edge flanges 35 as seen in FIG. 8. Such flanges 35 will be single-layer flanges which have upper edges 37; the inward surfaces 36 of these flanges 35 will outwardly abut the outward faces of lower edges 22 of certain side panels 20. In some embodiments the remaining opposing edges of base blank 30' may have sections 41 that can be folded upward along hinged connections 49, with subsections of sections 41 then being folded inwardly and downward along hinged connections 149, as evident from FIG. 7. This will produce first and second opposing edge flanges 41 that are inwardly-folded, double-layer flanges as evident in FIG. 8. These flanges will have upper edges 43; the inward surfaces 42 of these flanges will outwardly abut the outward faces of lower edges 22 of certain side panels 20. In some embodiments edges 34 of base 30 that have single-layer edge flanges will be present as a pair of opposing edges and edges 34 of base 30 that have double-layer edge flanges will be present as a second pair of opposing edges, as is evident from FIG. 8.

In some embodiments, the terminus 44 of a subsection of an edge flange 41 may comprise one or more mating tabs 45 that are each configured to reside in a complementary mating slot 46 in floor 31 of base 30; this can help to maintain the inwardly-folded, double-layer edge flange 41 in its inwardly-folded, double-layered condition. In some embodiments, the two opposing edges of base 30 that comprise single-layer edge flanges 35 rather than double-layer edge flanges 41, may each comprise first and second corner tabs 38 at opposing longitudinal ends of the single-layer flange 35. Each such corner tab 38 may extend integrally from a longitudinal end of single-layer flange 35 and may be hingedly connected thereto by a hinged connection 39. Each such corner tab 38 may be configured to reside in a space between the inward and outward layers of an inwardly-folded, double-layer flange of a neighboring edge of the base. (Such corner tabs 38 are not visible in FIG. 8, but the location of one such corner tab 38 is pointed out.) Such corner tabs may reinforce the corners 54 of base 30 and may provide overall stability and mechanical rigidity to base 30.

Similar arrangements can be made for cover 70, as will be evident from FIGS. 5 and 6. Thus in some embodiments, edge segments 75 (as shown in FIG. 5) of cover blank 70' can be folded downward along hinged connections 88 to form first and second opposing edge flanges 75 as seen in FIG. 6 (noting that in FIG. 6, cover 70 is viewed from underneath). Such flanges 75 will be single-layer flanges which have lower edges 77; the inward surfaces 76 of these flanges 75 will outwardly abut the outward faces of upper edges 21 of certain side panels 20. In some embodiments the remaining opposing edges of cover blank 70' may have sections 81 that can be folded downward along hinged connections 89, with subsections of sections 81 then being folded inwardly and upward along hinged connections 189, as evident from FIG. 5. This will produce first and second opposing edge flanges 81 that are inwardly-folded, double-layer flanges as evident in FIG. 6. These flanges will have lower edges 83; the inward surfaces 82 of these flanges will outwardly abut the outward faces of upper edges 21 of certain side panels 20.

In some embodiments, the terminus 84 of a subsection of an edge flange 81 may comprise one or more mating tabs 85 that are each configured to reside in a complementary mating slot 86 in ceiling 71 of cover 70; this can help to maintain the inwardly-folded, double-layer flange 81 in its inwardly-folded, double-layered condition. In some embodiments, the two opposing edges of cover 70 that comprise single-layer flanges 75 rather than double-layer flanges 81, may each comprise first and second corner tabs 78 at opposing longitudinal ends of the single-layer flange 75. Each such corner tab 78 may extend integrally from a longitudinal end of single-layer flange 75 and may be hingedly connected thereto by a hinged connection 79. Each such corner tab 78 may be configured to reside in a space between the inward and outward layers of an inwardly-folded, double-layer flange of a neighboring edge of the base. (Such corner tabs 78 are not visible in FIG. 6, but the location of one such corner tab 78 is pointed out.) Such corner tabs may reinforce the corners 94 of cover 70 and may thus provide overall stability and mechanical rigidity to cover 70 30.

Again, all such flanges in base 30 and cover 70 will typically be provided (by performing various folding operations on blanks 30' and 70' in the general manner described above) at the factory. In some embodiments, base 30 and cover 70 may be similar or identical in terms of the presence of two opposing single-layer edge flanges and two opposing double-layer edge flanges. However, this does not limit the orientation that base 30 and cover 70 can assume in the assembled air-filtration assembly 3. That is, base 30 and cover 70 may, but do not necessarily have to be, oriented so that single-layer flanges of the base are aligned with those of the cover and/or so that double-layer flanges of the base are aligned with those of the cover.

As previously discussed, in kit 1 as received by an end-user, base 30 and cover 70 will typically already have edge flanges (whether single-layer flanges, double-layer flanges, or a combination of both types) that are formed in the factory. Such flanges in base 30 and cover 70 will be positioned so that the outward sides of lower edges 22 and upper edges 21 of side panels 20 can be respectively abutted against the inward sides of these flanges in the general manner shown in FIG. 3. In many embodiments, base 30 and cover 70 will also comprise areas of floor 31 and ceiling 71 that can be manipulated, e.g. folded along hinged connections, to form various features of the base and cover that will facilitate the formation of air-filtration assembly 3. In particular, such areas can be folded to form tabs that help to hold side panels 20 in place in the assembled air-filtration assembly. In some embodiments, kit 1 will be supplied to an end user with all such areas in an unfolded condition, i.e. in which they are flush with floor 31 of base 30 or with ceiling 71 of cover 70. (In other words, such areas will still be in the unfolded condition in which they are present in blanks 30' and 70', as shown in FIGS. 5 and 7.) This can facilitate the providing of kit 1 in a nested, space-saving condition as discussed earlier herein. The end user can then manually unfold some or all of these areas to form various tabs as discussed in detail below.

Starting with cover 70, in various embodiments ceiling 71 of cover 70 may comprise multiple through-cuts and hinged connections that define multiple areas of ceiling 71 that are rotatable downward to provide multiple downwardly-protruding tabs. For example, in some embodiments, ceiling 71 of cover 70 may comprise at least four areas 90' (as shown in FIG. 5) that are each rotatable downward about a hinged connection 91 to form a downwardly-protruding tab 90 (as shown in FIG. 6). Some or all such areas 90' may be configured so that in the air-filtration assembly 3, the downwardly-protruding tab 90 formed by rotating the area 90' downward will inwardly abut an inward side of a portion of an upper edge 21 of at least one of the four side panels 20.

In some embodiments, areas 90', and cover 70, may be configured so that in air-filtration assembly 3, each downwardly-protruding tab 90 is hingedly connected to ceiling 71 of cover 70 by a hinged connection 91 that is oriented at least generally perpendicular to a long axis of an edge of the cover that the hinged connection 91 is adjacent to. Such an arrangement is evident e.g. for tab 90 and hinged connection 91 as labeled in FIG. 6; hinged connection 91 is oriented perpendicular to the long axis of the adjacent edge (which, in this case, is an edge with a double-layer flange). Such an arrangement can provide that the thus-formed tab 90 will exhibit a long axis (when viewed along the vertical axis of the assembly) that is generally perpendicular to the long axis of the edge of the cover that the hinged connection is adjacent to, again as evident in FIG. 6. Such arrangements can provide that the thus-formed tab 90 is oriented so that an outward end 92 of tab 90 inwardly abuts an inward face of a portion of the upper edge 21 of a side panel 20, in an edgewise manner. This is likewise evident in FIG. 6, which makes it clear that the outward end 92 of tab 90 will inwardly abut a portion of an inward face of an upper edge 21 of a side panel 20 that is seated in the space between the tab and the adjacent flange of the cover.

By abutting in an edgewise manner is meant that at least a portion of the outward edge 92 of tab 90 is in contact with the inward face of the upper edge 21 of side panel 20, rather than e.g. a major face of the tab being in contact with the inward face of the side panel. In some embodiments, any such tab 90 may be folded downward so that the tab protrudes downward exactly vertically, e.g. so that the tab is oriented at a 90 degree angle relative to ceiling 71 of cover 70. However, the tab need not necessarily be oriented at exactly 90 degrees, as long as the tab protrudes downward to a sufficient extent to hold the upper edge 21 of side panel 20 in place. (Thus, as noted earlier, the terminology of downwardly-protruding is to be interpreted as "at least generally" downwardly protruding.) In various embodiments a downwardly-protruding tab may be oriented within plus or minus 45, 25, 15, or 5 degrees of exactly vertical. (Although not repeated herein for brevity, the above considerations apply in like measure to upwardly-protruding tabs 50 of base 30.)

In some embodiments, a cover 70 may be configured so that ceiling 71 of cover 70 comprises eight areas 90' that are hingedly connected to ceiling 71 so as to be able to be folded downward to form tabs 90. In some embodiments, such areas/tabs may be present in four pairs. Each pair may be located in a corner of the ceiling (exemplary pair 95 of tabs 90 in corner 94 of ceiling 71 is indicated in FIG. 6). Each pair of tabs may comprise a first tab 96 with an outward end 97 that is configured to inwardly abut the inward side of the upper edge of a first side panel in an edgewise manner and a second tab 98 with an outward end 99 that is configured to inwardly abut the inward side of the upper edge of a second, neighboring side panel in an edgewise manner, as is evident for tab pair 95 as shown in FIG. 6. Also as shown in FIG. 6, in some embodiments, the hinged connection of the first tab to ceiling 71, and the hinged connection of the second tab to ceiling 71, may be oriented at least generally perpendicular to each other.

In some embodiments, all four corners of cover 70 may be equipped with pairs of tabs 90 of the general design described above; such arrangements can provide that each side panel 20 that is mated to the cover, will be supported by two such tabs. As can be appreciated from comparison of FIGS. 5 and 6, in some embodiments cover 70 will be configured so that in air-filtration assembly 3, each downwardly-protruding tab 90 will be adjacent to a minor through-aperture 93 in ceiling 71 of cover 70. A through-aperture 93 will result from an area 90' of ceiling 71 being rotated about its hinged connection 91 of the area to the ceiling to form the downwardly-protruding tab 90, thus leaving behind the minor aperture 93 in the space formerly occupied by the area 90'. The presence of minor apertures 93 e.g. in the general form and arrangement depicted in FIG. 6, will not be expected to have any deleterious effect on the performance of the air-filtration assembly. That is, the vast majority of the filtered air will exit the filtered-air cavity 6 through central aperture 80 (as discussed below). A minor portion of the filtered air may exit cavity 6 through one or more minor apertures 93 but this has not been found to have a significant impact on the filtration performance.

As noted earlier herein, ceiling 71 of cover 70 is a partial ceiling; that is, ceiling 71 comprises a central through-aperture 80 which is the primary (and, in some embodiments, the only) opening by which filtered air can exit filtered-air cavity 6 of air-filtration assembly 3. It has been found that the presence of such a central through-aperture 80, that occupies e.g. from 65% to 95% of the nominal area of ceiling 71, can enhance the air-filtration performance of assembly 3 when it is coupled with a box fan. It has also been found that a central through-aperture 80 with a generally circular shape seems to offer the best performance; it is however noted that the aperture 80 does not necessarily need to be exactly circular. Rather, the aperture 80 may be e.g. somewhat oval, polygonal (e.g. with six or more sides), and/or can be irregular at least at some points along an otherwise e.g. generally circular perimeter.

Turning now to base 30, in various embodiments floor 31 of base 30 may comprise multiple through-cuts and hinged connections that define multiple areas of floor 31 that are rotatable upward (by the end-user) to provide multiple upwardly-protruding tabs. For example, the exemplary design shown in FIGS. 7 and 8 depicts four areas 50' that are each rotatable upward to form an upwardly-protruding tab 50. Each such area 50' is configured so that in air-filtration assembly 3, the upwardly-protruding tab 50 formed by rotating area 50' upward will inwardly abut a portion of an inward face of a lower edge 22 of at least one of the four side panels 20. Similar to areas 90' of cover 70, each such area 50' will be located so that a portion of an edge of a side panel will reside in a space between the tab and a portion of one of the flanges of the base.

The tabs 50 of base 30 differ in design from the tabs 90 of cover 70, however. With reference to FIGS. 7, and 8, each tab 50 comprises a first section 55 that is hingedly connected to floor 31 of base 30 by a hinged connection 51. This hinged connection 51 is oriented at least generally perpendicular to a long axis of an edge 34 of base 30 that hinged connection 51 is adjacent to. This will provide that this first section 55 of tab 50 exhibits a long axis that is at least generally perpendicular to the long axis of the edge of the base that hinged connection 51 is adjacent to, as evident from FIG. 8. This will have the effect that an outward end 52 of this first section 55 of tab 50 inwardly abuts an inward face of a portion of a lower edge 22 of a first side panel 20, in an edgewise manner.

Tab 50 may further comprise a second section 56 that integrally extends from an inward end of first section 55 and is hingedly connected thereto along integral, hinged connection 57. This can allow an end user to fold second section 56 relative to first section 55 along hinged connection 57, so that the long axis of second section 56 is oriented at least generally 90 degrees away from the long axis of first section 55. This will cause tab 50 to be generally L-shaped as evident in FIG. 8. (To allow this, a through-cut 58 will be provided along the (former) junction of second tab section 56 and ceiling 71 rather than hinged connection 51 extending into this region.) In some embodiments, the long axis of second section 56 of tab 50 (when the tab is folded in this manner) will be at least generally perpendicular to the long axis of an edge of the base that an outward end 59 of the second section 56 of the tab is closest to. This will have the effect that the outward end 59 of second section 56 of tab 50 inwardly abuts an inward face of a portion of a lower edge of a second, neighboring side panel, in an edgewise manner. In other words, a tab that is generally L-shaped may be provided in a corner 54 of base 30, with a first section 55 of the tab having an end that abuts a first side panel in an edgewise manner, and with a second section 56 of the tab having an end that abuts a second, neighboring side panel in an edgewise manner, as can be appreciated from examination of FIG. 8.

In some embodiments, a tab 50 may be further configured so that the second section 56 of tab 50 comprises a mating slot 61. This mating slot 61 of second section 56 of tab 50 may (upon appropriate folding) be mated to a complementary mating slot 63 of a reinforcing tab 62 that extends upwardly from floor 31 of base 30; this can serve to securely hold second section 56 of tab 50 in position and indeed can reinforce the entirety of tab 50. Such a reinforcing tab 62 may comprise a hinged connection (unnumbered, but readily evident in FIGS. 7 and 8) to floor 31 of base 30; such a hinged connection may be e.g. parallel to the above-mentioned hinged connection 51 to facilitate the use of the reinforcing tab. In some embodiments, all four corners of base 30 may be equipped with tabs 50 of the general design described above; such arrangements can provide that each side panel 20 that is mated to base 30, will be supported by two tabs.

The formation of tabs 50 by folding areas 50' in floor 31 of base 30 will generate minor apertures 53 in similar manner as discussed above for minor apertures 93 in ceiling 71 of cover 70. These minor apertures will, in most uses, be blocked by a horizontal surface that base 30 will rest upon, so that little entry of unfiltered air into filtered-air cavity 6 is expected to occur through these minor apertures. It would only be, e.g., the placing of base 30 onto an extremely rough or discontinuous surface (e.g. a grating or the like) that might result in entry of enough unfiltered air to compromise the performance of the air-filtration assembly. In such cases, an auxiliary panel or sheet may be used to block the minor apertures; it is noted however that this is not expected to be needed in the vast majority of uses of the air-filtration assembly.

In some embodiments, a base 30 may comprise a central aperture akin to central aperture 80 of cover 70. Thus in some embodiments, a kit 1 as disclosed herein may comprise a cover 70 and a base 30 that are identical to each other, so that it is of no consequence which is chosen as the cover and which is chosen as the base. The presence of such a large central aperture in the base should not pose any issue as long as the base is positioned on a reasonably flat and continuous surface.

Figure 9:
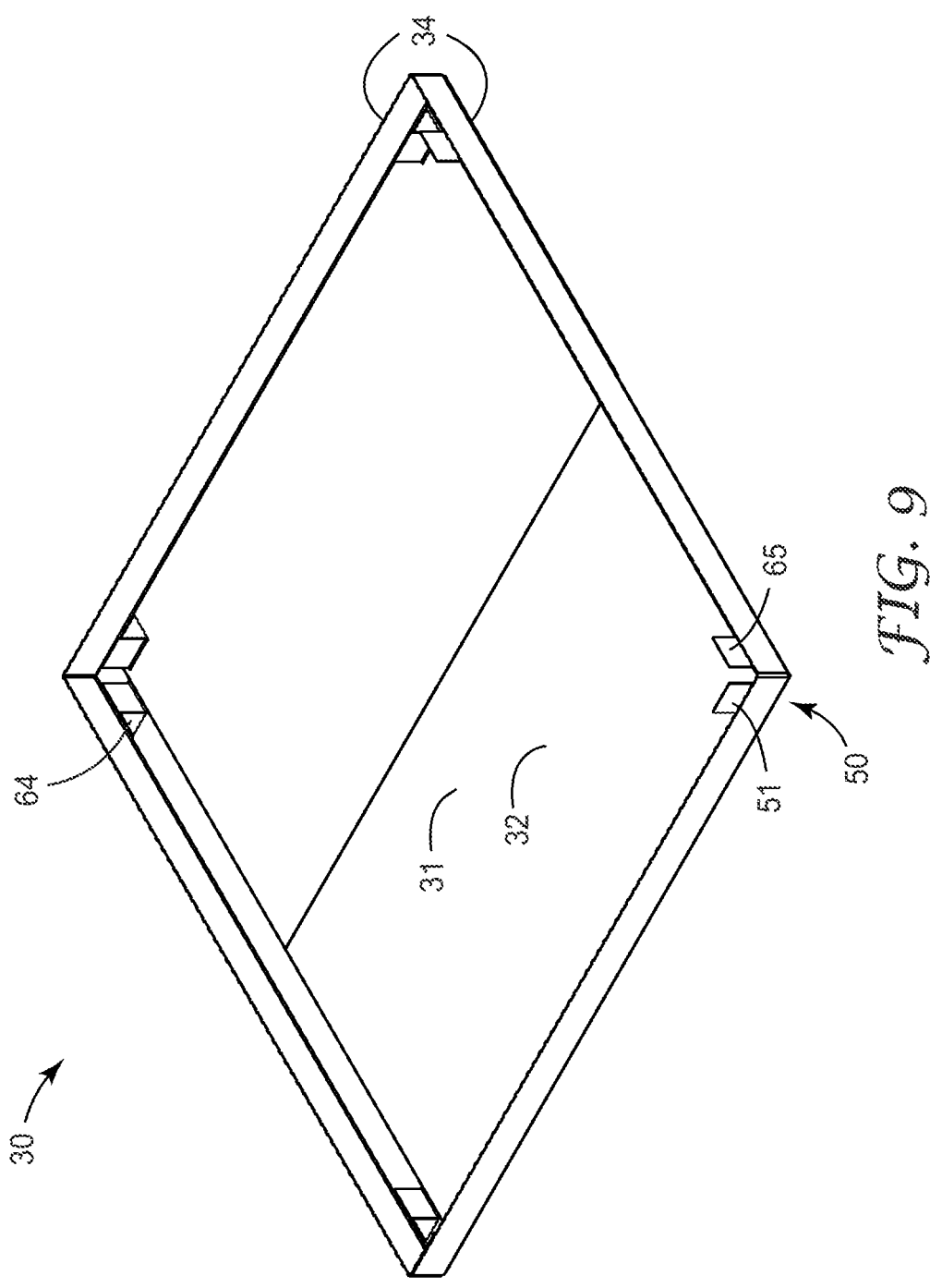
FIG. 9 is a perspective view, from above, of an another exemplary base that can serve as a component of a herein-disclosed kit.

The herein-described approach of providing a floor 31 of a base 30 and/or a ceiling 71 of a cover 70 with areas that can be folded to form tabs, can be used in any arrangement, embodiment, or combination. Any tab arrangement that is described herein for use in a base, may be used in a cover, and vice versa. Any area of a base or ceiling that is to be folded into a tab, may optionally be provided with an opening that serves as a fingerlift that provides easy access to the edge of the tab for folding (several such fingerlifts, unnumbered, are visible in FIG. 7). The particular arrangements discussed above, in which tabs are folded so as to be abutted edgewise against an inward face of an edge of a side panel, are not the only possible arrangement. Thus for example, FIG. 9 illustrates a general approach in which each tab 50 (of a base 30, in this case) is arranged with its hinged connection 51 to floor 31 oriented at least generally parallel to an edge 34 of base 30 to which the tab 50 is adjacent. In such a case, a major outward surface 65 of the tab 50 will be the tab component that inwardly abuts the inward face of an edge of a side panel 20 (such an arrangement can be contrasted with the previously-described approach in which an end of a tab inwardly abuts an inward face of an edge of a side panel in an edgewise manner). A base or cover may have one or more tabs that are configured in this manner (any such tab or tabs may be used in combination with one or more other tabs that operate in an edgewise manner).

The particular arrangement depicted in FIG. 9 will produce minor apertures 64 (resulting from folding the tabs 50) that are between the thus-formed tabs 50 and the edge flanges of the base (or cover). It is expected that these minor apertures will be blocked by the edges of the side panels as installed in the base or cover, and/or by the horizontal surface that the base is placed on. It is thus not expected that any significant inward leakage of unfiltered air, nor any deleterious effect on the filtration performance, would result from the presence of such minor apertures.

A cover 70 and base 30 may be made of any suitable material. In some embodiments, the material may be cardboard, chipboard or the like. In particular embodiments, the material may be corrugated cardboard, comprising e.g. two outer linerboards (e.g. of 115-200 gsm kraft paper) with a fluted sheet therebetween (e.g. of Flute Size A, B or C). In some embodiments, some or all of the surfaces of the material (e.g. linerboard) that will be visible in the assembled air-filtration assembly may be treated for cosmetic or aesthetic reasons. For example, such surfaces may be coated with a white pigment such as clay, titanium dioxide, barium sulfate, or the like; such a surface may be more amenable to being printed upon. Thus in some embodiments, at least some outer surfaces of the base and/or cover may be printed with indicia (such as e.g. arrows indicating direction or orientation upon assembly), printed with decorative insignia or patterns, and so on.

With such materials, the previously-described throughcuts, hinged connections, and so on, may be achieved in any suitable manner. For example, through-cuts may be provided by die cutting, laser-cutting, water-jetting, and so on. A hinged connection may be provided e.g. by a scoring method such as crush-scoring or cut-scoring along a desired line, by performing perforation along a desired line, and so on. Various methods of scoring, cutting, perforating, and so on, so as to form folding lines, hinged connections, throughcuts, and so on, are described e.g. in in U.S. Patent Application Publication 2020/0139285, which is incorporated by reference herein in its entirety. Any hinged connection as provided by any such method will typically be an integral connection.

In some embodiments, a base or cover may be made of an organic polymeric material. Such an approach may use any of many commonly available moldable or thermoformable plastic resins. Such materials may be subjected to any of the cutting/scoring methods mentioned above; however, in some embodiments one or more hinges may be present in the form of so-called living hinges. A living hinge is a thin section of material that integrally connects two flanking sections of the same material, with the thin section being sufficiently thin that is flexible so that it can serve as an integral hinge between the two flanking sections. In some embodiments, one or more features (e.g., flanges, tabs, channels, etc.) may be permanently formed into a plastic base or cover, rather than being provided as areas that must be folded to form the features. Such features may be formed e.g. by injection molding, thermoforming, and similar methods.

A kit 1 as disclosed herein can be assembled into an air-filtration assembly 3 in a matter of minutes. As noted, in at least some embodiments, the use of adhesive tape (or any other fastening, connecting or sealing method or entity, whether to occlude leaks, and/or to provide mechanical stability to the assembled structure) may not be required. An end-user may thus remove kit 1, e.g. as a stack, from any packaging 2 as illustrated in FIG. 1. Base 30 may be removed from the stack. Base 30, as supplied, will already have edge flanges 35 and 41 as discussed earlier herein. Any areas 50' of base 30 may be manipulated to form tabs 50 in the general manner discussed earlier herein, so that base 30 attains the ready-for-assembly configuration shown in FIG. 6. Four side panels 20 (e.g., four framed air filters 110) may then be installed into base 30; that is, the lower edges 22 of the side panels may be inserted into the spaces between the various tabs 50 and the various edge flanges 35 and 41 of base 30.

An advantageous feature of this arrangement is that base 30 can support the four side panels 20 in their upstanding condition while cover 70 is brought into position. This differs from conventional assembly of an air-filtration unit of this general type, in which some or all such side panels may have to be manually held in position, e.g. by a persons hand(s), while they are secured to a base or cover and/or to each other. This conventional procedure can involve considerable time and, in particular, may be difficult for one person to accomplish without help. The use of a base 30 as disclosed herein, which can temporarily support all four side panels in their upstanding position while cover 70 is brought into position, can make it much easier to assemble airfiltration assembly 3 from kit 1. It is further noted that the use of a "pinwheel" arrangement of the four side panels 20 as mentioned earlier herein can further enhance the collective stability of the four side panels, both when the airfiltration assembly is partially assembled (e.g. with the four side panels installed in base 30) and in the final, finished air-filtration assembly. This is because in such a pinwheel configuration of the four side panels, each side panel will have one side edge at which it is supported by a side edge of a neighboring side panel that is abutted against that side edge.

With the four side panels 20 in place upon base 30, cover 70 can be brought into position. Similar to base 30, cover 70, as supplied, will already have edge flanges. If desired, the end user can manipulate areas 90' of cover 70 to form some or all of the above-described tabs before bringing cover 70 into position atop the four side panels. However, it has been found more expedient to bring cover 70 into position as a first step; this allows cover 70 to be easily positioned atop the four upper edges 21 of the four side panels 20 without having to slidably fit the upper edges 21 of the side panels 20 into a narrow gap between the tabs 90 and the edge flanges 75 and 81 of cover 70. Once cover 70 is in place, the various areas 90' of cover 70 can be folded downwards (simply by pressing a finger downward against the upward surface of the area) to form tabs 90. As the various tabs 90 are formed, the tabs will press against the inward faces of the upper edges 21 of the side panels and urge the side panels into their proper position, abutted against the inward faces of the edge flanges of the cover. A snug fit of the cover onto the upper edges 21 of the side panels 20 can thus be achieved without having to painstakingly fit the upper edges of the side panels into pre-existing, narrow gaps between tabs and flanges. (Of course, an end user may nevertheless pre-form some or all of the various tabs 90 in cover 70 before fitting cover 70 onto the side panels, if desired.)

The result of this operation will be an assembled airfiltration assembly 3 as shown in exemplary embodiment in FIG. 2. A kit 1 can be assembled in this manner into an air-filtration assembly (needing only to have a box fan disposed atop it to be fully functional) by a single person, in a matter of a few minutes. Although it is envisioned that a kit 1 can be assembled into an air-filtration assembly 3 without the use of adhesive tape or the like, in some embodiments adhesive tape may be used in certain locations. For example, strips of adhesive tape may be applied to joints between neighboring side panels, if desired. It is emphasized however that such arrangements are not essential to the assembly and functioning of the air-filtration assembly.

An air-filtration assembly 3 as depicted in exemplary embodiment in FIG. 2 need only to have a box fan 7 disposed atop cover 70 in order to function. That is, a box fan 7 can be positioned in the general manner depicted in FIG. 3, and the motor activated to cause the fan-blade assembly (impeller) to rotate. This will cause ambient air to be drawn inward through the one or more side panels that is an air filter, so that the filtered air reaches cavity 6 and is then expelled therefrom in the manner indicated by the arrows in FIG. 3. Any suitable box fan may be used; most such box fans are so-called axial fans in which the rotation axis of the impeller is aligned with the overall airflow generated by the impeller. Box fan 7 should have a housing 8 that is congruent with cover 70, meaning that the edges of the fan housing 8 are of a similar size and shape as the flanged perimeter of cover 70. In some embodiments, in order for the lower edge 17 of housing 8 of box fan 7 to rest on a suitable area of upward-facing surface 73 of partial ceiling 71 of cover 70, the box fan housing 8 should have a size and shape that causes the lower edge 17 of the box fan to rest on an area of upper surface 73 of ceiling 71 that is aligned with, and/or is slightly inward of (e.g. by 0.25-1.5 cm), the edge flanges of cover 70. This can provide that the lower edge 17 of box fan housing 8 is in good contact with upper surface 73 of cover 70 around the entire perimeter of box fan housing 8, in order to minimize any air-entry leaks between the lower edge 17 of fan housing 8 and the upper surface 73 of cover 70.

In other words, a box fan of a nominal 20"×20" size may be used with a cover 70 (and base 30) of nominal 20"×20" size. In some embodiments, such a combination may be used with four side panels 20 in the form of e.g. air filters of 20"×20" nominal size, so that the air-filtration assembly is in the shape of a nominal 20"×20"×20" cube with a box fan disposed atop. As noted earlier, in some embodiments the air filters may be shorter in height than in length (e.g. they may be 20"×14"); the resulting air-filtration assembly will still be square when viewed along the vertical axis but will be a "squat" rectangular parallelepiped rather than a cube, when viewed from the side.

In similar manner as with the assembly of air-filtration assembly 3, it has been found that in many embodiments it is not necessary to occlusively/hermetically seal the housing 8 of box fan 7 to cover 70 in order to obtain excellent air-filtration performance. That is, it is typically not necessary to tape box fan 7 to cover 70; rather, the weight of the box fan itself has been found to provide a sufficient force to hold the lower edge 17 of fan housing 8 against cover 70 to adequately minimize any air-entry slit leaks between the fan housing and the cover.

Thus in other words, it is not necessary to tape the box fan to the cover (although this may be done if desired). This can provide further advantages. For example, while some box fans may comprise controls (e.g. a knob that can be rotated between off, low, medium and high fan speed settings) mounted on a minor side of the fan housing as with knob 9 as shown in FIG. 3, some box fans have controls that are centrally located, e.g. near the rotation axis of the impeller. (This can eliminate the need to run wiring to the outer housing of the fan.) Such controls are often located on the "rear" side of the fan; that is, the side from which air is drawn into the fan. In most instances, an air-filtration assembly 3 and box fan 7 will be operated in a mode as shown in FIG. 3, in which the "rear" side of the fan faces the filtered-air cavity 6. (This is so the fan can be run in a mode in which there is little airflow resistance downstream of the fan, which allows an axial impeller of the type used in most box fans to be operated in the most efficient manner.) If such a fan, with controls on the rear of the fan, is secured to an air-filtration assembly e.g. with adhesive tape, the fan controls will be difficult to access. The arrangements presented herein provide that the box fan can simply be temporarily lifted off of cover 70, the fan controls changed to the desired setting, and the fan returned into position atop cover 70.

As discussed earlier, the present investigations have revealed that the low pressure created in the interior of the assembly by the suction of the fan can cause the base, side panels and/or cover to be drawn together in a manner that minimizes any potential air-entry slit leaks. In addition, the weight of the box fan itself tends to urge various items against each other (e.g. the lower edge 17 of the fan housing 8 against the upward-facing surface 73 of cover 70, the downward-facing surface 72 of ceiling 71 of cover 70 against the upper edges 21 of side panels 20, and the lower edges 22 of side panels 20 against the floor 31 of base 30) in a manner which tends to minimize any potential air-entry slit leaks. These and other considerations as discussed herein can ensure that the desired air-filtration performance is obtained without the necessity of occlusively/hermetically sealing various items to each other. Thus again, the present disclosures allow the construction of a ready-to-operate air-filtration assembly in minimal time, and without the necessity of using adhesive tape in the assembly process.

In at least some embodiments, an air-filtration assembly as disclosed herein can be easily disassembled. In some embodiments this may involve separating the base and cover from a spent set of framed air filters so that the base and cover can be used with a fresh set of framed air filters. In some embodiments, the entire assembly (including all of the framed air filters) can be separated into individual parts so that the broken-down assembly can be moved to a new location and reassembled. In some embodiments, the entire air-filtration assembly can be disassembled, the above-described tabs returned to their original positions in which they are flush with the ceiling or floor of the cover or base, and the entire assembly can be reformed into a nested stack which occupies minimum volume (and which can be re-inserted into the original package or box) for easy transportation or storage. In some embodiments, any such disassembly may be performed by physical manipulation of the cover, base, and/or the four side panels, without the necessity of removing or disconnecting any mechanical or adhesive connector(s) (e.g. adhesive tape, caulk, staples, mechanical fasteners, hook-and-loop fasteners, and so on) from the cover, base, and/or the four side panels.

The present investigations have revealed that the disposing of an auxiliary cover atop the upward side of box fan 7 may provide a slight enhancement (as manifested e.g. as an approximately 5-15% increase in CADR) in the filtration performance. Thus in some embodiments, such an auxiliary cover can be used. Such an auxiliary cover may resemble ceiling 71 in having a partial ceiling and a central through-aperture; the auxiliary cover may or may not have edge flanges. Particularly if the auxiliary cover does not have edge flanges, it may need to be attached to the box fan to ensure that the airflow does not dislodge the auxiliary cover. Such an arrangement may, in some embodiments, be a special case in which a small amount of e.g. adhesive tape is used for the specific purpose of holding an auxiliary cover on the box fan. In some embodiments, such an auxiliary cover may comprise flanges (e.g. so that the auxiliary cover closely resembles cover 30, except that it will likely have no tabs). Such flanges may allow the auxiliary cover to be disposed atop the box fan so that the flanges provide a friction-fit to the outward edges of the box fan housing; such a friction fit may reduce or eliminate the need to use any attachment means such as adhesive tape to hold the auxiliary cover in place. If an auxiliary cover is included, it may be packaged with the other components of kit 1, e.g. as part of a nested stack. In some embodiments, an auxiliary base sheet may be provided, e.g. if the air-filtration assembly 3 is to be positioned on a very rough or discontinuous surface. Such a sheet may be e.g. a sheet of cardboard that is packaged with the other components of kit 1 and can be placed beneath base 30 of the assembled air-filtration assembly to block any minor apertures in base 30.

It will be apparent to those skilled in the art that the specific exemplary embodiments, elements, structures, features, details, arrangements, configurations, etc., that are disclosed herein can be modified and/or combined in numerous ways. In summary, numerous variations and combinations are contemplated as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A kit that is assemblable to provide a disassemblable air-filtration assembly, the kit comprising:
   a square base that comprises a floor with an upward-facing surface and that comprises a perimeter with four edges;
   four rectangular side panels, at least one of which is a framed air filter; and,
   a square cover that comprises a partial ceiling with a downward-facing surface and that comprises a perimeter with four edges,
      wherein the kit is configured so that it is assemblable into a disassemblable air-filtration assembly comprising the base, the cover, and the four side panels, with lower edges of the side panels abutted against the upward-facing surface of the floor of the base and with upper edges of the side panels abutted against the downward-facing surface of the partial ceiling of the cover, so that the base, the four side panels, and the cover collectively form an upwardly-open, horizontally-closed air-filtration assembly that is in the shape of a cuboid and that defines a filtered-air cavity within the assembly,
and,
wherein the floor of the base comprises multiple through-cuts and hinged connections that define multiple areas of the floor that are rotatable upward to provide multiple upwardly-protruding tabs and the ceiling of the cover comprises multiple through-cuts and hinged connections that define multiple areas of the ceiling that are rotatable downward to provide multiple downwardly-protruding tabs, and wherein the kit is provided with all of the areas of the floor and ceiling that are rotatable to form protruding tabs, in non-rotated positions in which they are respectively flush with the floor and the ceiling, the areas of the floor and ceiling being rotatable into rotated positions in which they respectively form the upwardly-protruding tabs and the downwardly-protruding tabs that, in the air-filtration assembly, hold the lower edges of the side panels in place between the upwardly-protruding tabs and upwardly-extending edge flanges of the base and hold the upper edges of the side panels in place between the downwardly-protruding tabs and downwardly-protruding edge flanges of the cover.

2. The kit of claim 1 wherein all four of the side panels are framed air filters.

3. The kit of claim 1 wherein the kit is configured so that in the air-filtration assembly, the lower edges of the side panels are in non-occlusive, disconnectable contact with the base and the upper edges of the side panels are in non-occlusive, disconnectable contact with the cover, so that the base and cover are disconnectable from the four side panels.

4. The kit of claim 1 wherein each of the four edges of the base comprises an upwardly-extending edge flange that extends along the entire length of the edge, the upwardly-extending edge flanges defining a thickness of the base; and, wherein each of the four edges of the cover comprises a downwardly-extending edge flange that extends along the entire length of the edge, the downwardly-extending edge flanges defining a thickness of the cover; and, wherein the kit is configured so that in the air-filtration assembly, each of the upwardly-extending edge flanges of the four edges of the base outwardly abuts an outward face of at least the lower edge of at least one of the side panels, and each of the downwardly-extending edge flanges of the four edges of the cover outwardly abuts an outward face of at least the upper edge of at least one of the side panels.

5. The kit of claim 4 wherein the kit is provided in the form of a nested stack with the four side panels sandwiched between the base and the cover, and wherein the nested stack exhibits a total thickness that is less than 80% of a combined thickness of the base, the cover, and the four side panels, so that the nested stack exhibits a nesting ratio that is less than 80%.

6. The kit of claim 4 wherein the kit is configured so that in the air-filtration assembly, two opposing edges of the four edges of the base each comprise an upwardly-extending edge flange that is an inwardly-folded, double-layer edge flange.

7. The kit of claim 6 wherein the kit is configured so that in the air-filtration assembly, each of the inwardly-folded, double-layer edge flanges comprises a terminal end that has at least one mating tab that resides in a complementary mating slot in the floor of the base to maintain the inwardly-folded, double-layer edge flange in its inwardly-folded, double-layered condition.

8. The kit of claim 7 wherein the kit is configured so that in the air-filtration assembly, the two opposing edges of the base that do not comprise inwardly-folded, double-layer edge flanges, each comprise a single-layer edge flange with first and second corner tabs extending integrally from, and hingedly connected to, opposing longitudinal ends of the single-layer edge flange, each corner tab being configured to reside in a space between inward and outward layers of an inwardly-folded, double-layer edge flange of a neighboring edge of the base.

9. The kit of claim 1 wherein the floor of the base comprises at least four areas that are each rotatable upward to form an upwardly-protruding tab, each area being configured so that in the air-filtration assembly, the upwardly-protruding tab formed by rotating the area upward will inwardly abut an inward face of a portion of a lower edge of at least one of the four side panels.

10. The kit of claim 9 wherein the kit is configured so that in the air-filtration assembly, a first section of each upwardly-protruding tab is hingedly connected to the floor of the base by a hinged connection that is oriented at least generally perpendicular to a long axis of an edge of the base that the hinged connection is adjacent to, so that the first section of the tab exhibits a long axis that is generally perpendicular to the long axis of the edge of the base that the hinged connection is adjacent to, so that an outward end of the first section of the tab inwardly abuts an inward face of a portion of a lower edge of a first side panel, in an edgewise manner.

11. The air-filtration assembly of claim 1 wherein the ceiling of the cover comprises a central through-opening that occupies at least 75% of a nominal total area of the ceiling of the cover and that is at least generally circular.

12. The kit of claim 1 wherein the ceiling of the cover comprises at least four areas that are each rotatable downward to form a downwardly-protruding tab, each area being configured so that in the air-filtration assembly, the downwardly-protruding tab formed by rotating the area downward will inwardly abut an inward face of a portion of an upper edge of at least one of the four side panels.

13. The kit of claim 1 wherein the floor of the base is a partial floor and wherein the base and the cover are identical to each other and are interchangeable with each other.

14. The kit of claim 1 wherein the base and the cover are each made of corrugated cardboard.

15. A method of assembling a disassemblable air-filtration assembly from the kit of claim 1, the method comprising:
  placing the base on a generally horizontal surface with upwardly-extending edge flanges of the edges of the base extending upward;
  folding the multiple areas of the floor of the base along the hinged connections so that the areas are rotated upward to provide upwardly-protruding tabs;

inserting lower edges of the four side panels into spaces between the upwardly-extending edge flanges of the edges of the base, and the upwardly-protruding tabs of the floor of the base, so that the four side panels are held in a generally upright position by the upwardly-protruding tabs acting in combination with the upwardly-extending edge flanges,
placing the cover atop upper edges of the four side panels so that the upper edges of the four side panels inwardly abut downwardly-extending edge flanges of the edges of the cover,
and,
folding the multiple areas of the ceiling of the cover along the hinged connections so that the areas are rotated downward to provide downwardly-protruding tabs so that the upper edges of the four side panels are held in position by the downwardly-protruding tags acting in combination with the downwardly-extending edge flanges.

16. A disassemblable air-filtration assembly obtained from assembling the kit of claim 1.

17. The disassemblable air-filtration assembly of claim 16 wherein the four rectangular side panels are arranged in pinwheel fashion when the air-filtration assembly is viewed along a vertical axis of the air filtration assembly, so that the air-filtration assembly is in the shape of a square when viewed along the vertical axis.

18. A method of filtering air, comprising:
  positioning the air-filtration assembly of claim 16 on a generally horizontal surface so that an underside of the base rests on the generally horizontal surface;
  positioning a box fan atop the cover, the box fan comprising a housing sized and shaped to be congruent with the cover;
  and,
  operating the box fan so that ambient air is drawn in through the at least one side panel of the assembly that is a framed air filter so as to enter the filtered-air cavity of the air-filtration assembly as filtered air, with the filtered air then being expelled generally upward and out of the filtered-air cavity by the box fan.

19. The method of claim 17 wherein the fan is non-occlusively, disconnectably connected to the cover.

20. A method of at least partially disassembling the disassemblable air filter assembly of claim 16, the method comprising:
  removing the cover from the upper edges of the four side panels, and
  removing the base the lower edges of the four side panels, with the proviso that the method is performed by physical manipulation of the cover, base, and/or the four side panels, without disconnecting any mechanical or adhesive connectors from the cover, base, and/or the four side panels.

\* \* \* \* \*